United States Patent [19]

Uchimi et al.

[11] Patent Number: 5,076,671
[45] Date of Patent: Dec. 31, 1991

[54] LIQUID CRYSTAL DEVICE HAVING TWO BISTABLE ORIENTATION STATES IN THE CHIRAL SMECTIC TEMPERATURE RANGE

[75] Inventors: Toshiharu Uchimi, Atsugi; Akio Yoshida, Chigasaki; Kazuya Ishiwata, Yokosuka; Takashi Enomoto, Zama, all of Japan

[73] Assignee: Canon Kabushiki Kaisha, Tokyo, Japan

[21] Appl. No.: 451,364

[22] Filed: Dec. 15, 1989

[30] Foreign Application Priority Data

Dec. 22, 1988 [JP] Japan .................. 63-322203
Jun. 29, 1989 [JP] Japan .................. 1-168958

[51] Int. Cl.$^5$ .................................................. G02F 1/13
[52] U.S. Cl. ................................. 359/56; 340/784; 359/75; 359/63
[58] Field of Search ............ 350/350 S, 341, 340, 350/337, 333; 340/784

[56] References Cited

U.S. PATENT DOCUMENTS

| | | | |
|---|---|---|---|
| 4,116,658 | 9/1978 | Sano | 350/341 |
| 4,367,924 | 1/1983 | Clark et al. | 350/334 |
| 4,639,089 | 1/1987 | Okada et al. | 350/341 |
| 4,666,253 | 5/1987 | Yoshida | 350/330 |
| 4,674,839 | 6/1987 | Tsuboyama et al. | 350/334 |
| 4,759,614 | 7/1988 | Yokokura et al. | 350/350 S |
| 4,783,148 | 11/1988 | Tsuboyama et al. | 350/341 |
| 4,796,979 | 1/1989 | Tsuboyama | 350/350 S |
| 4,932,757 | 6/1990 | Hanyu et al. | 350/350 S |
| 4,932,758 | 6/1990 | Hanyu et al. | 350/350 S |

FOREIGN PATENT DOCUMENTS

| | | | |
|---|---|---|---|
| 107216 | 8/1981 | Japan | 350/350 S |
| 58-176623 | 10/1983 | Japan | 350/350 S |
| 60-70417 | 4/1985 | Japan | 350/350 S |
| 60-201325 | 10/1985 | Japan | 350/350 S |
| 52528 | 3/1987 | Japan | 350/341 |
| 63-124030 | 5/1988 | Japan | 350/350 S |

*Primary Examiner*—Rolf Hille
*Assistant Examiner*—Minhloan Tran
*Attorney, Agent, or Firm*—Fitzpatrick, Cella, Harper & Scinto

[57] ABSTRACT

A liquid crystal device includes a pair of substrates with a orientation controlling film being provided on at least one of the substrates through a base layer, and a ferroelectric smectic liquid crystal which is disposed between the substrates. The orientation controlling film has a uniaxial orientation processing axis. The ferroelectric smectic liquid crystal generates two different stable orientation states at high and low temperatures regions within the temperature range achieving the ferroelectric smectic phase. The ferroelectric smectic liquid crystal is in one of the two stable orientation states which is generated at the low temperature region when the liquid crystal in the other stable orientation state generated at the high temperature region cools. Where d is the thickness of the orientation controlling film and S is the average surface roughness of the base layer, d and S have the relation expressed by $$0 \leq S/d < 0.70.$$

56 Claims, 16 Drawing Sheets

FIG. 2
21 BLUE BRIGHT STATE
22 BLUE DARK STATE
20 C1 ORIENTED DOMAIN (52.0°C)
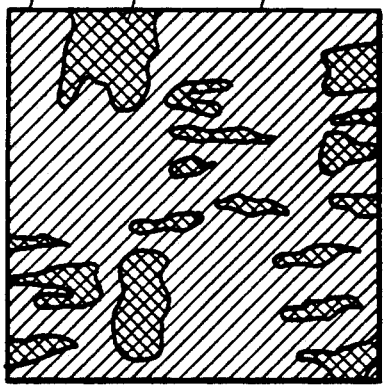
(X100)
RUBBING DIRECTIONS A ARE PARALLEL TO AND THE SAME WITH EACH OTHER
FIG. 3
30 C2 ORIENTED DOMAIN
40 C1/C2 ORIENTED DOMAIN
31 32
22
21
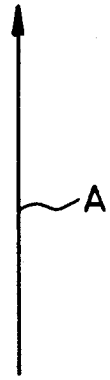
A
(X100)
20 C1 ORIENTED DOMAIN (X100)

DIRECTION A OF RUBBING →

PRIOR ART
FIG. 10 (A)
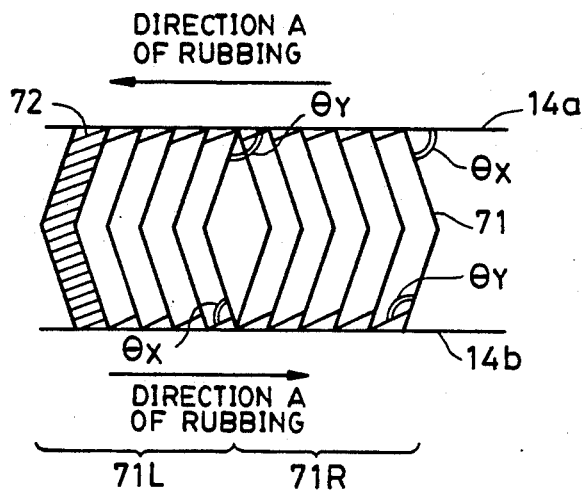
PRIOR ART
FIG. 10 (B)
PRIOR ART
FIG. 10 (C)
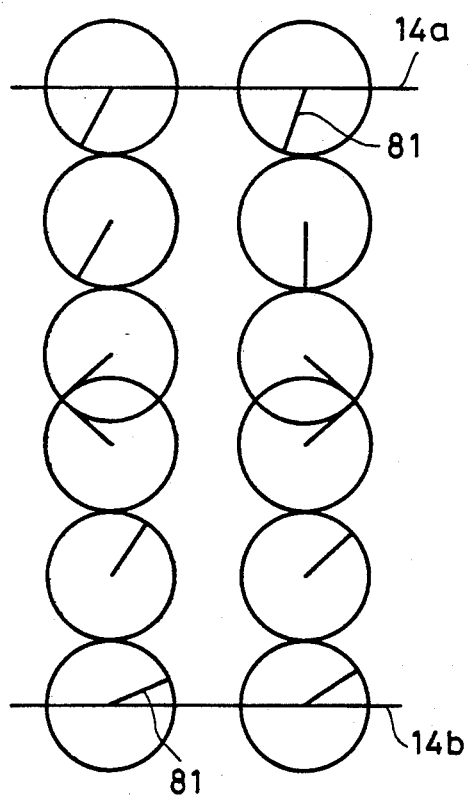
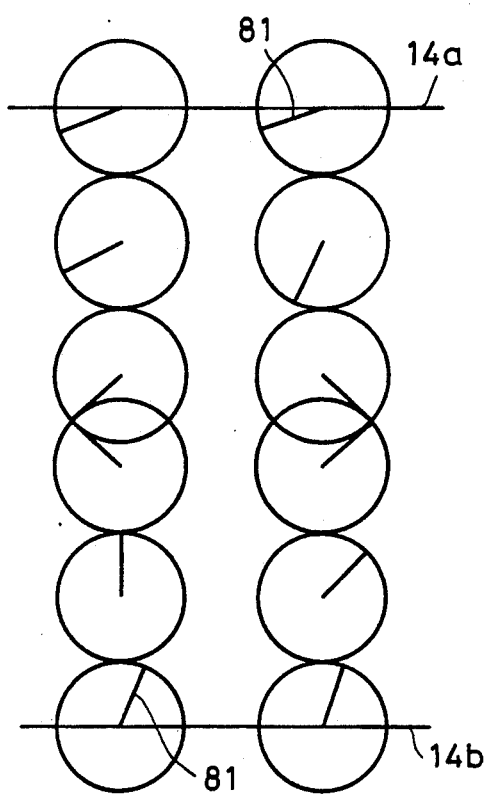

LIQUID CRYSTAL DEVICE HAVING TWO BISTABLE ORIENTATION STATES IN THE CHIRAL SMECTIC TEMPERATURE RANGE

BACKGROUND OF THE INVENTION

1. Field of the Invention

The present invention relates to a liquid crystal device for use, for example, in a display device, an optical shutter array, etc., and more particularly, to a liquid crystal device which employs a ferroelectric liquid crystal having two bistable orientation states in the chiral smectic temperature range. In particular, the present invention concerns a novel liquid crystal device which features improved orientation uniformity, durability and contrast between bright and dark states.

2. Description of the Related Art

Display devices which control the intensity of light which passes through them by means of a polarizer-liquid crystal-polarizer assembly and the refractive anisotropy of ferroelectric liquid crystal molecules are known. Such display devices have been proposed in the specifications of, for example, Japanese Patent Laid-Open No. 56-107216, U.S. Pat. No. 4,367,924 to Clark et al and so on. The ferroelectric liquid crystal of the mentioned above type is generally in the chiral smectic C (SmC*) or H (SmH*) phase in a particular temperature range. By disposing the helically structured chiral smectic C or H liquid crystal between a pair of substrates separated by a distance sufficiently small to ensure that the helix unwinds, the liquid crystal orientation field is found to possess two stable optical states. The bistable ferroelectric liquid crystal can be switched between its two stable states by reversing the polarity of an externally applied electric field. Also, since the liquid crystal can maintain an image in the absence of the electric field, it therefore functions as a memory. The liquid crystal is characterized by its high-speed response to changes in the electric field, which enables the liquid crystal to be applied to high-speed memory-type display devices.

In order to manufacture an optical modulation device using the ferroelectric smectic liquid crystal with a bistable orientation field and which exhibits memory and high-speed response characteristics on a commercial basis, the two stable states must be present both uniformly and stably. Moreover, the optical modulation device must have excellent durability, as well as high contrast between its bright and dark states Okada et al discloses in U.S. Pat. No. 4,639,089 a ferroelectric smectic liquid crystal having a temperature range achieving the cholesteric phase which is utilized in a liquid crystal device provided with a uniaxial orientation processing axis obtained by a rubbing or an oblique deposition process. However, the ferroelectric smectic liquid crystal device which exhibits uniform bistable characteristics achieved by the rubbing or oblique deposition processes is sometimes observed to pass less light in a bright state than the liquid crystal device proposed by N. A. Clark et al.

In the aforementioned ferroelectric smectic liquid crystal device exhibiting uniform bistability, the uniform bistability requires that the liquid crystal molecules be aligned in a highly ordered state. Such highly ordered molecular orientation states are easily affected by external stress such as impact or strain, and if the ordered molecular orientation is disrupted, the liquid crystal generates a sanded texture. The generation of a sanded texture upon impact is described in, for example, U.S. Pat. No. 4,674,839 to Tsuboyama et al.

The present inventors conducted various experiments and determined that, although use of a sufficiently thick (for example, 600 Å or more) high polymeric organic film as an orientation controlling film ensures a sufficiently uniform molecular orientation over a wide area, it nevertheless deteriorates the driving characteristics of the liquid crystal device in which it is installed. It has been proposed in Japanese Laid-Open Patent No. Sho 62-52528 that ferroelectric liquid crystal bistability can be achieved by using a high polymeric organic film having a thickness of at most 200 Å. Although it is preferred to use a thin high polymeric organic film as the orientation controlling film from the viewpoints of attaining excellent driving and bistable characteristics, the thin high polymer film causes defects in the molecular orientation, precluding the attainment of uniformly oriented molecules. Of course, a liquid crystal with molecular orientation defects does not exhibit excellent bistability.

The present inventors have also conducted experiments and determined that when a large black portion and a large white portion are displayed on a display panel (as shown in FIG. 18 (A)) and the display is switched so that the panel only displays white, the area of the panel which previously displayed black had a lower transmittance (i.e., remained in a light gray state) than did the previous white display portion. See FIG. 18 (B). Additionally, since the gray portion is maintained for a relatively long period of time, when the new contents were displayed, the newly displayed contents were superimposed over the previously displayed light gray portion. This is called "burning" of the previously displayed contents The burning phenomenon provides for a display which is difficult for an operator of, for example, a word processing device to view.

SUMMARY OF THE INVENTION

An object of the present invention is to provide a ferroelectric smectic liquid crystal device whiCh overcomes the aforementioned problems of the prior art, in particular, the burning of previously-displayed contents, by an improvement in bistability.

To attain this object, the present invention provides a device in which a ferroelectric liquid crystal is disposed between a pair of substrates with an orientation controlling film having a uniaxial orientation processing axis provided on at least one of the substrates through a base layer. The ferroelectric smectic liquid crystal generates different bistable orientation states at high and low temperature regions within the temperature range achieving the ferroelectric smectic phase. The ferroelectric smectic liquid crystal is placed in one orientation of the lower of the two bistable orientation states (i.e., the orientation state which is generated at the low temperature range) when the liquid crystal in the higher bistable state (i.e., the orientation state generated at the high temperature region) cools. The liquid crystal device is characterized in that $$0 < d \leq 600 \text{ Å},$$

$$0 \leq S \leq 100 \text{ Å},$$

and $$0 \leq S/d < 0.70,$$

where d is the thickness of the orientation controlling film, and S is the average surface roughness of the base layer.

The present invention also provides a device in which a ferroelectric liquid crystal is disposed between a pair of substrates with a orientation controlling film having a uniaxial orientation processing axis is provided on at least one of the substrates through a base layer. The ferroelectric smectic liquid crystal possesses two different stable orientation states in which pairs of hairpin defects and lightning defects occur, wherein in one of the two bistable states a lightning defect occurs prior to a hairpin defect along the direction of the uniaxial orientation processing axis. The liquid crystal device is characterized in that, $0 < d \leq 600$ Å, $0 \leq S \leq 100$ Å, and $0 \leq S/d < 0.70$, where d is the thickness of the orientation controlling film, and S is the average surface roughness of the base layer.

In one preferred form of the present invention, the orientation controlling film is provided on both of the substrates in the pair of substrates such that the uniaxial orientation processing axis given to one of the orientation controlling films is substantially parallel (i.e., defining a crossed axes angle of at most 30°) to and in the same direction as that provided on the other orientation controlling film. In another preferred form of the present invention, the uniaxial processing axes of the two orientation controlling films are both parallel to each other and in the same direction.

BRIEF DESCRIPTION OF THE DRAWINGS

FIGS. 2 to 6 show sketches of microphotographs showing the effect of temperature on ferroelectric liquid crystal molecular orientation;

FIG. 7 (B) is a cross-sectional view of the C1 and C2 orientation domains of FIG. 7 (A);

FIG. 7 (C) is a schematic plan view of other C1 and C2 orientation domains;

FIG. 7 (D) is a cross-sectional view of the C1 and C2 orientation domains of FIG. 7 (C);

FIG. 8 (B) shows the C-directors of the C1 orientation of FIG. 8 (A);

FIG. 9 (B) shows the C-directors of the C2 orientation of FIG. 9 (A);

FIG. 10 (A) is a schematic view of a conventional orientation;

FIGS. 10 (B) and 10 (C) show the C-directors of the conventional orientation of FIG. 10 (A);

DETAILED DESCRIPTION OF THE PREFERRED EMBODIMENTS

Through intensive studies the present inventors examined the reason why defects are generated in the molecular orientation (preventing uniform molecular orientation) when the orientation controlling film is thin, and found that this phenomenon occurs because the orientation of the liquid crystal molecules is affected by the surface roughness of a base layer, including ITO electrodes, dielectric films and Si coupling agent layers, on which the orientation controlling film is provided. It was also found that even with base layers having the same surface roughness, different molecular orientations were provided by the orientation controlling films having different thicknesses. Hence, the inventors examined the relation between the surface roughness of the base layer, the thickness of the orientation controlling film and the molecular orientation, and obtained the results shown in FIG. 17.

Figure 17:
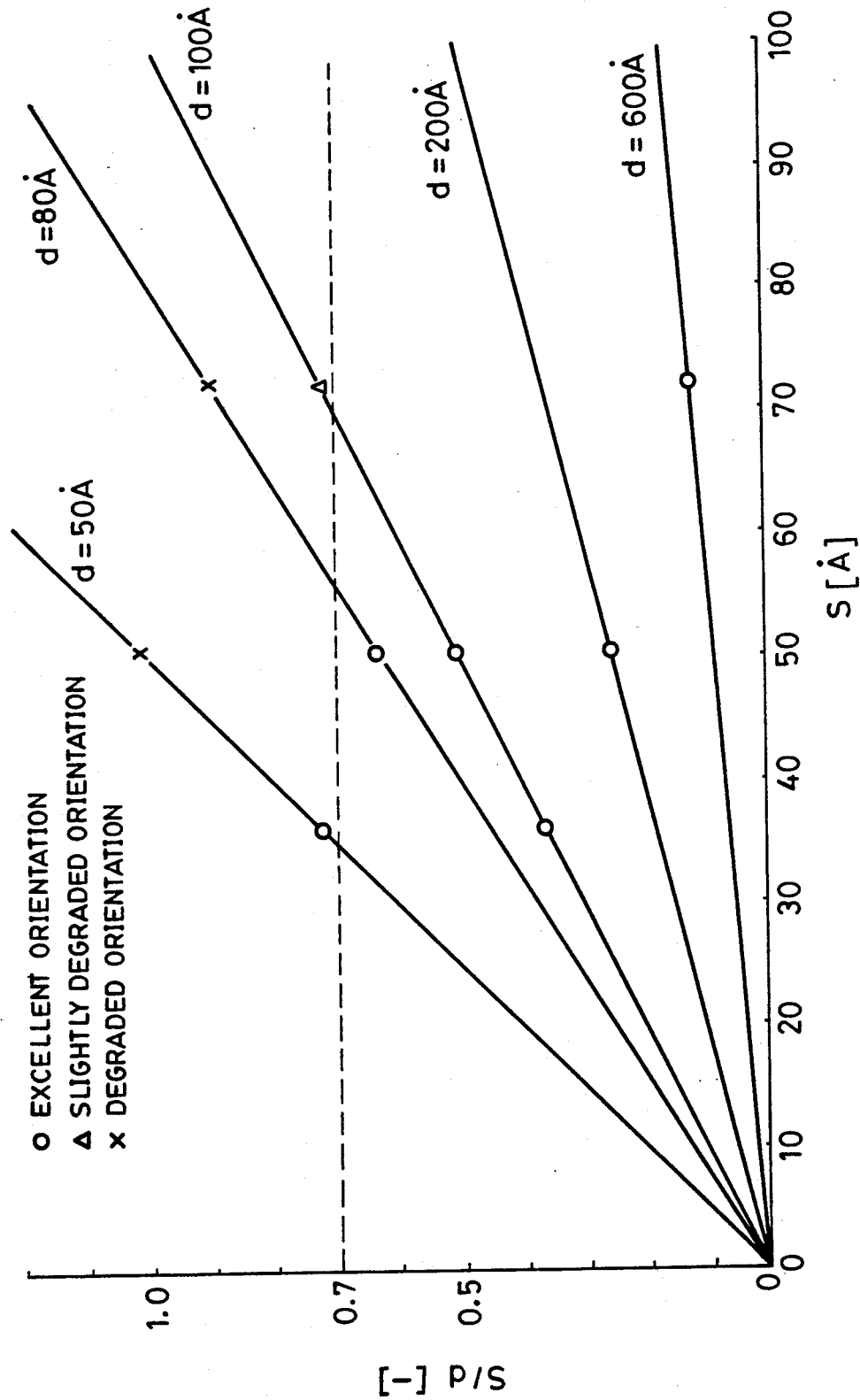
FIG. 17 is a graph showing the relation between the average surface roughness of a base layer, the thickness of a high polymeric organic film, and molecular orientation.

In FIG. 17, reference symbol d denotes the thickness of the orientation controlling film, and S denotes the surface roughness of the base layer on which the orientation controlling film is provided. The base layer may be either an ITO electrode, an inorganic or organic dielectric film, or a Si coupling agent layer. In the case shown in FIG. 17, the base layer was the ITO electrode, and the thickness of the ITO electrode was proportional to the surface roughness thereof. A scanning type tunnel microscope (STM, Nanoscope II, manufactured by Toyo Technica K.K.) was used to measure the average surface roughnesses, and the standard deviation of the measured values was calculated. When the average surface roughness exceeded 100 Å, the thickness of the ITO electrode was 4000 Å or above whereupon cracks were generated in the electrode and no measurement was conducted.

As can be seen from the graph in FIG. 17, under the condition of $0 \leq S/d < 0.7$, excellent molecular orientation can be achieved even if the high polymeric organic film is thin.

The present invention is attained on the basis of the above-described knowledge.

Figure 1:
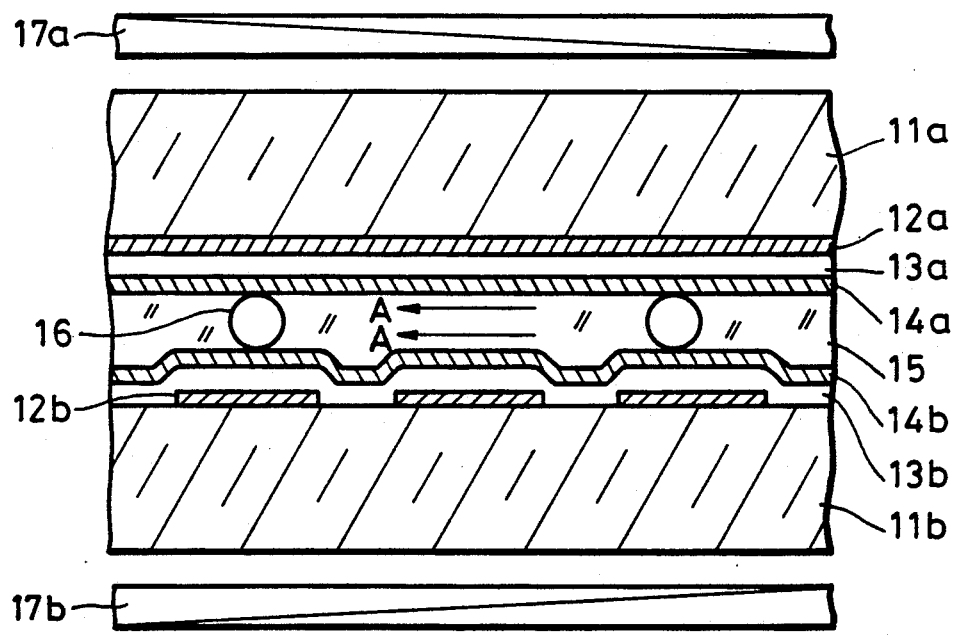
FIGS. 1 (A) and (B) are cross-sectional views of a liquid crystal device according to the present invention.
Figure 1B:
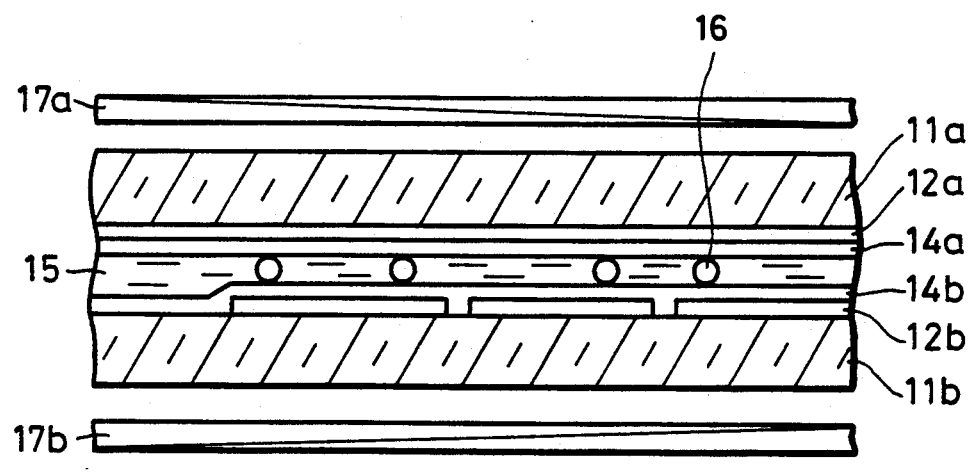

FIG. 1(A) is a schematic view of an example of a ferroelectric liquid crystal cell according to the present invention, and FIG. 1(B) is a view similar to FIG. 1 (A) in which the dielectric films (which are described later) are omitted.

Transparent electrodes 12a and 12b, made of $In_2O_3$, indium tin oxide or the like, are respectively coated on substrates (made of glass) 11a and 11b, and dielectric films 13a and 13b (made of $SiO_2$, $TiO_2$, $Ta_2O_5$ or the like) and orientation controlling films 14a and 14b made of polyimide, polyamide, polyester or the like are formed on the electrodes 12a and 12b, respectively. The dielectric films 13a and 13b have a thickness ranging from 200 Å to and the orientation controlling films 14a and 14b have a thickness of 600 Å or less.

The orientation controlling films 14a and 14b are disposed in such a manner that the directions (indicated by the arrows in FIG. 1 (A)) in which they are rubbed are parallel to and the same with each other. A ferroelectric smectic liquid crystal 15 is disposed between the substrates 11a and 11b, which are spaced by a distance which is sufficiently small to ensure unwinding of the helix (for example, from 0.1 $\mu$m to 3 $\mu$m) and thus, enables the ferroelectric smectic liquid crystal 15 to be in either of the two stable orientation states. Bead spacers 16 (silica beads or alumina beads) are disposed between the substrates 11a and 11b in order to maintain the separation of the substrates.

For the purpose of optically discriminating the orientations of the liquid crystal molecules, two polarizers 17a and 17b are disposed in the cell in the crossed nicols state.

Figure 7:
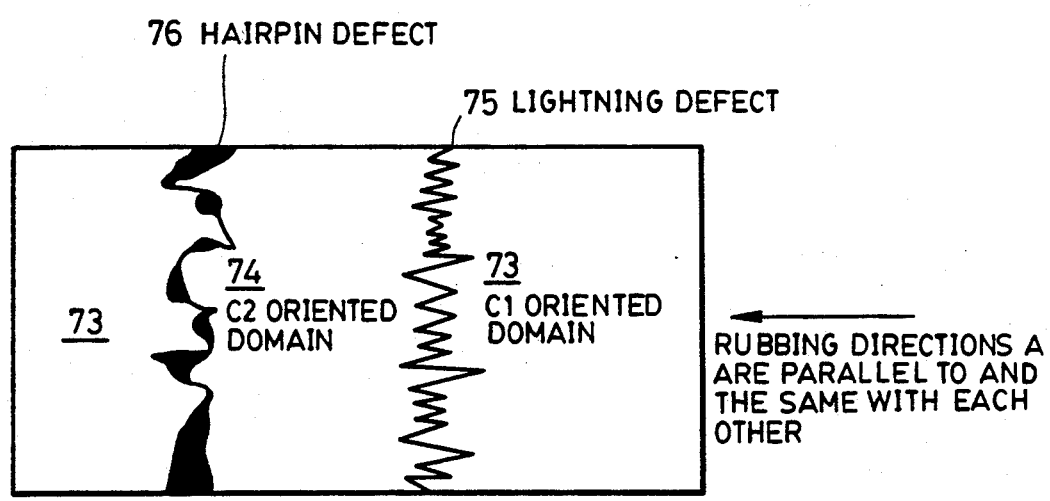
FIG. 7 (A) is a schematic plan view of C1 and C2 orientation domains.
Figure 7:
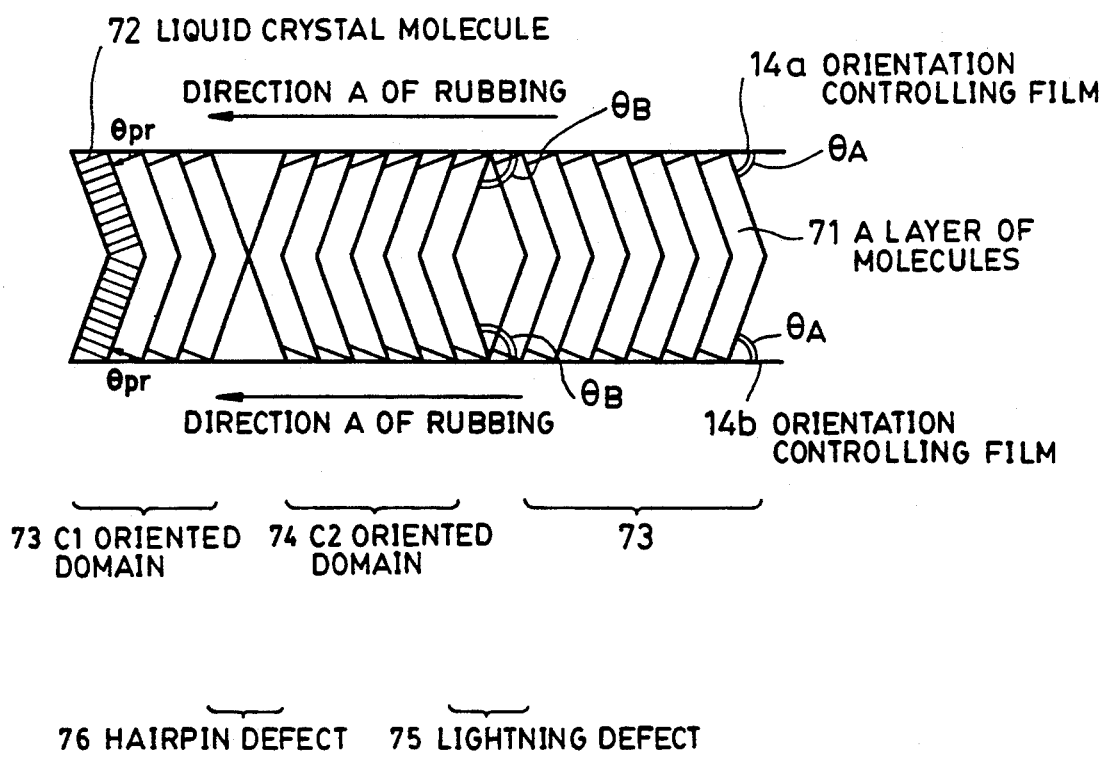
Figure 7C:
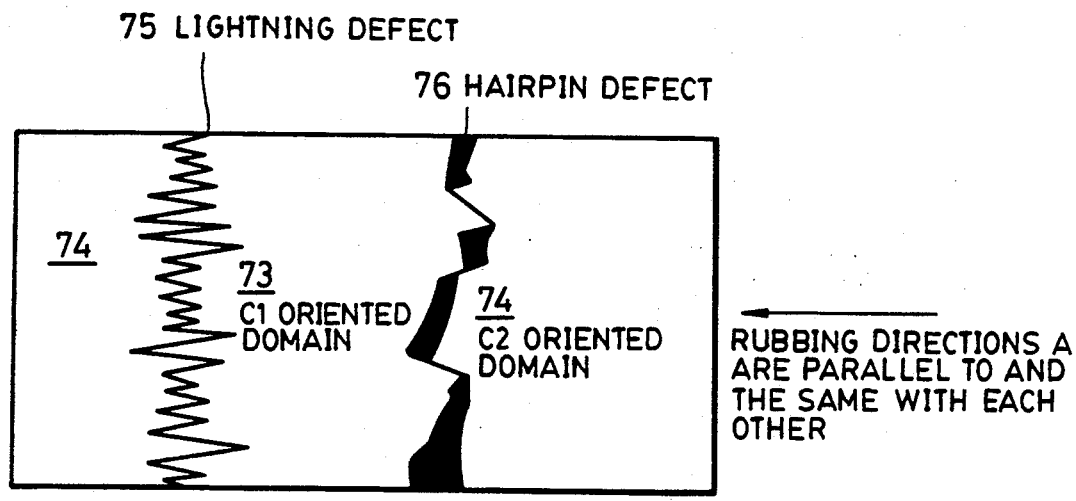
Figure 7D:
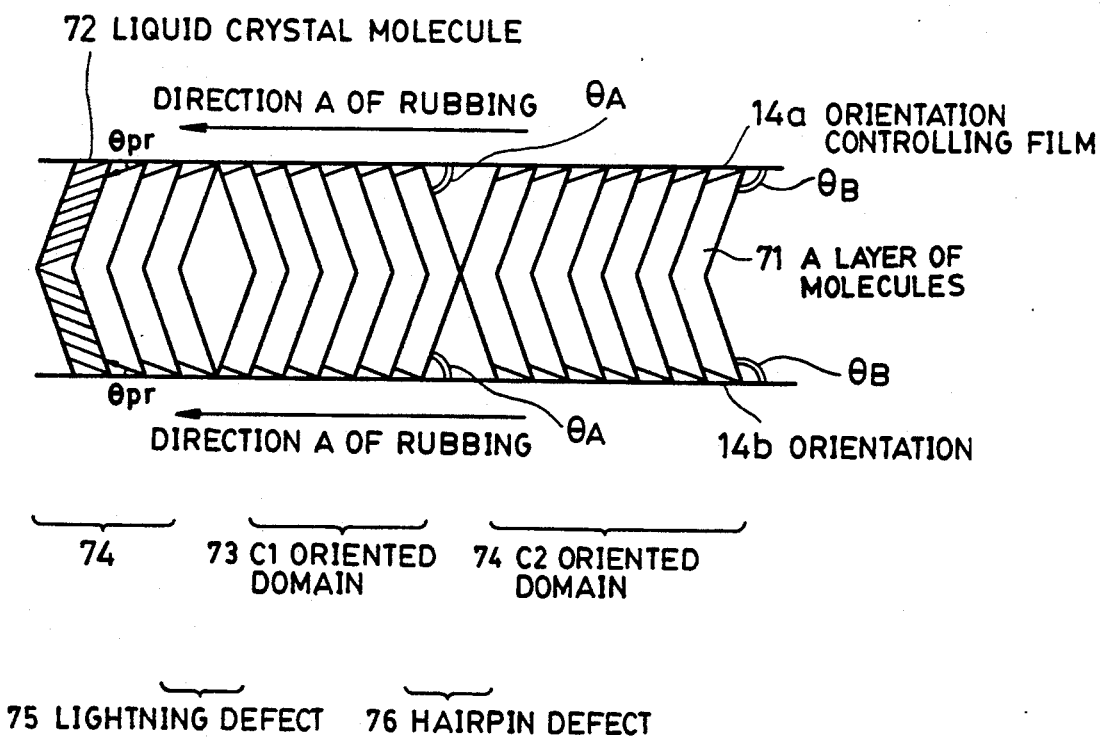

In the present invention, by using the liquid crystal materials and the orientation controlling films explained below, the two bistable orientation states of the resultant liquid crystal generated at the high and low temperature regions of the chiral smectic C phase temperature range differ from each other the bistable orientation states generated at the low temperature region are highly stable against impacts or strains, and exhibits high contrast between light and dark states Also, in the ferroelectric smectic liquid crystal having the stable state generated in the lower temperature region, a hairpin defect occurs before a lightning defect along the direction of the rubbing process (i.e., the direction in which the liquid crystal molecules tilted at a pretilt angle of $\theta$pr are projected onto the surface of the substrate, as shown in FIG. 7). In the ferroelectric smectic liquid crystal in the bistable state generated in the high temperature region, a lightning defect occurs before a hairpin defect along the direction of the rubbing process. In the liquid crystal cell according to the present invention, the hairpin defects have an width of a few microns, and the lightning defects are generated in a zigzag fashion and have a width of 1 $\mu$m or less. Hereinafter, for convenience, the orientation state generatec at tne high temperarure region of the temperature range achieving the chiral smectic C phase will be referred to as the "C1 orientation". Similarly, the orientation state 9enerated at the lower temperature region will be referred to as the "C2 orientation". This nomanclature is only used for convenience, however, since these two different orientation states also occur depending on factors other than a change in temperature, as will be described later.

Figure 4:
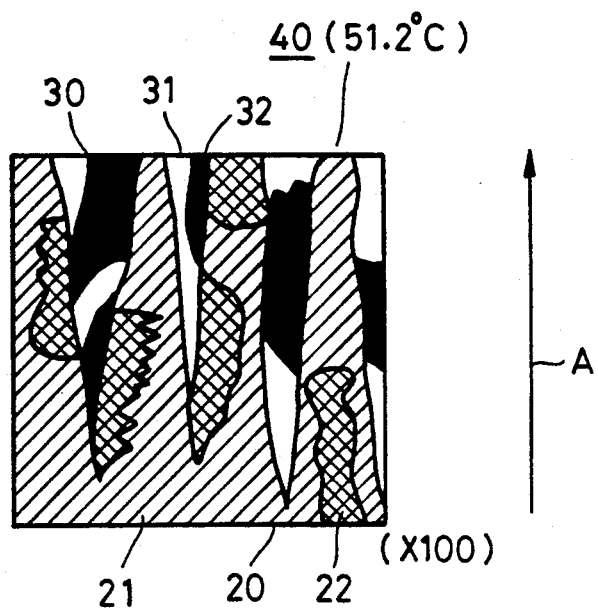
Figure 5:
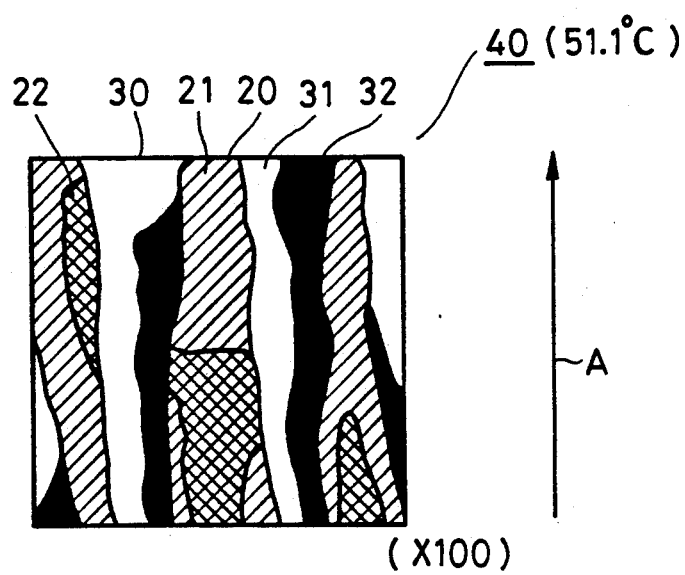
Figure 6:
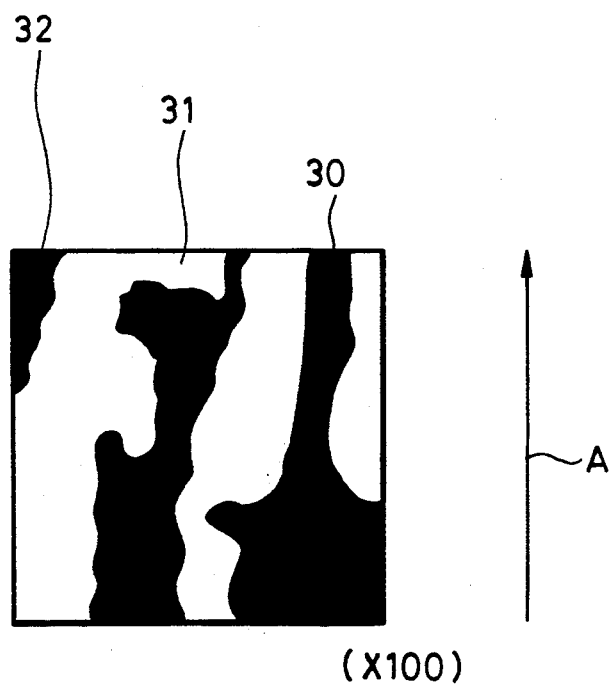

FIG. 2 is a sketch of a microphotograph ($\times$100) of the C1 orientation. FIGS. 3 to 5 are sketches of microphotographs ($\times$100) of a mixed state (which will hereinafter be referred to as the "C1/C2 mixed orientation") of the C1 orientation state and the C2 orientation state. FIG. 6 is a sketch of a microphotograph ($\times$100) of the C2 orientation. The liquid crystal cell according to the present invention is dominated by C1 orientation domain 20 shown in FIGS. 2 to 5. All the microphotographs shown in FIGS. 2 to 6 were taken in the darkest state obtained under 90° crossed nicols (known as the "extinct state").

"CS-1014" a brand name of a ferroelectric smectic as the liquid crystal material and "Sunever 150" a brand name of an alicyclic polyimide film-forming liquid manufactured by nissan Chemicals Industries, Ltd., was used to form the orientation controlling films. Rubbing was performed parallel to the upper and lower substrates and in the same direction. The two substrates were spaced 1.5 $\mu$m apart (details of which are described below in Example 1). The phase transition temperatures of the resultant cell were as follows:

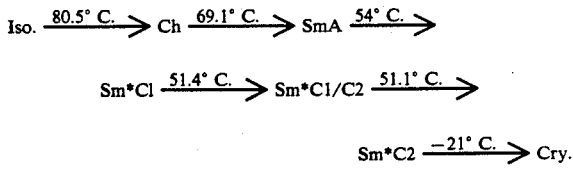

Iso: Isotropic phase
Ch: Cholesteric phase
SmA: Smectic A phase
Sm*C1: C1 orientation state phase in the chiral smectic C phase
Sm*C1/C2: C1/C2 mixed orientation state phase in the chiral smectic C phase
Sm*C2: C2 orientation state phase in the chiral smectic C phase
Cry: Crystal phase The phas transition points between Iso and Ch; Ch and SmA; SmA and Sm*C1; and Sm*C2 and Cry, were measured by amodel "FP800" temperature control device manufactured by the Swiss company Mettler. The phase transition points between Sm*C1 and Sm*C1/C2, and between Sm*C1/C2 and Sm*C2 were obtained by observing a cooling liquid crystal through a microscope.

In FIG. 2, the C1 orientation domain 20 was blue in the extinct state and had bright blue portions 21 and dark blue portions 22. In FIG. 6, the C2 orientation domain 30 was black in the extinct state, and had bright black portions 31 and dark black portions 32. In FIGS. 3 to 5, both the C1 orientation domains 20 (which were blue in the extinct state) and the C2 orientation domains 30 (which were black in the extinct state) were co-present in a mixed state.

After +30 V of pulses having a period of 50 $\mu$sec were applied to the liquid crystal which were respectively under the C1 orientation domain 20, the C2 orientation domain 30 and the C1/C2 mixed orientation domain 40, the states of the liquid crystal in the extinct state were observed. The C1 orientation domain 20 was blue in the extinct state, while the C2 orientation domain 30 was black in the extinct state. Then, $-30$ V of pulses having a width of 50 $\mu$sec were applied to the liquid crystal which were respectively under the C1 orientation domain 20, C2 orientation domain 30 and the C1/C2 mixed orientation domain 40, and the states of the liquid crystal were observed in the extinct state. The C1 orientation domain 20 was also blue in the extinct state, while the C2 orientation domain 30 was also black in the extinct state.

From the above-described experiments, it was discovered that, in the temperature range which achieved the chiral smectic C phase, the liquid crystal had both the C1 orientation domains 20 as well as the C2 orientation domains 30 (which differ from each other) and that the C2 orientation domains 30 gradually grew to such an extent that the existence of the C1 orientation domains 20 could be disregarded (the C2 orientation domain 30 occupied 60% or more the overall area, excluding the peripheral portion of the sealing material) while the liquid crystal was being cooled. It was also found that the ferroelectric smectic liquid crystal element, which was dominated by the C2 orientation domain 30, was more stable when subjected to external impacts or strains, and exhibited high contrast between the bright and dark states, as compared to either the liquid crystal which was dominated by the C1 orientation domain 20 or a conventional liquid crystal having two stable orientation states which were generated by rubbing the upper and lower substrates parallel to each other and in the opposite directions. This will become apparent from the following description of examples.

FIGS. 3, 4 and 5 show the C1/C2 mixed orientation domains 40 which were respectively obtained at 51.3° C., 41.2° C. and 51.1° C., as the liquid crystal cools and how the C1/C2 mixed orientation domain 40 grows into the C2 orientation domain 30. From FIGS. 3, 4 and 5, it is apparent that the C2 orientation domain 30 forms through the the C1 orientation domain 20 shown in FIG. 2 and the C1/C2 mixed orientation domains 40 shown in FIGS. 3 to 5.

FIGS. 7 (A) and 7 (B) are schematic plan and cross-sectional views of a liquid crystal dominated by the C1 orientation domain with a hairpin defect and a lightning defect generated therein. Similarly, FIGS. 7 (C) and 7 (D) are schematic plan and cross-sectional views of a liquid crystal dominated by the C2 orientation domain with a hairpin defect and a lightning defect generated therein.

In FIG. 7, layers 71 of liquid crystal molecules are each composed of plural chiral smectic C liquid crystal molecules 72 which are formed in a gap between the upper and lower orientation controlling films 14a and 14b orientation processed in the direction indicated by the arrows A. The molecule layes 71 are divided into those which form C1 orientation domains 73 and those which form a C2 orientation domain 74.

In FIG. 7, the molecule layers 71 which form the C1 orientation domain 73 are tilted at an acute angle $\theta A$ in the vicinity of the upper and lower orientation controlling films 14a and 14b, whereas the molecule layers 71 which form the C2 orientation domain 74 are tilted at an obtuse angle of $\theta B$ in the vicinity of the upper and lower orientation controlling films 14a and 14b.

A hairpin defect 76 and a lightning defect 75 occur in the adjacent portions between the C1 orientation domain 73 and the C2 orientation domain 74. In the C1 orientation domain 73 shown in FIG. 7 (A) and 7 (B), the hairpin defect 76 is generated in advance of the lightning defect 75 along the direction A of the rubbing process. In the C2 orientation domain 74 shown in FIGS. 7 (C) and 7 (D), the lightning defect 75 occurs in advance of the hairpin defect 76 along the direction A of the rubbing process.

When a strain is applied to the cell having the C1 orientation domain 20 shown in FIG. 2, the C2 orientation domain is generated at the position where the strain is applied. In other words, the adjacent areas between the C1 orientation domain and the C2 orientation domain are generated, thereby generating the hairpin defect and the lightning defect.

Figure 8A:
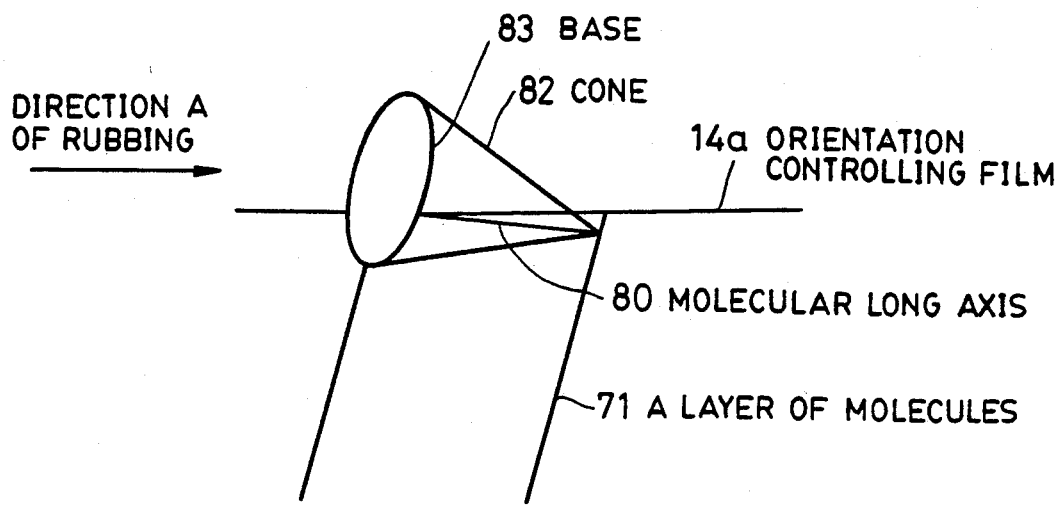
FIG. 8 (A) is a schematic view of the C1 orientation.
Figure 8B:
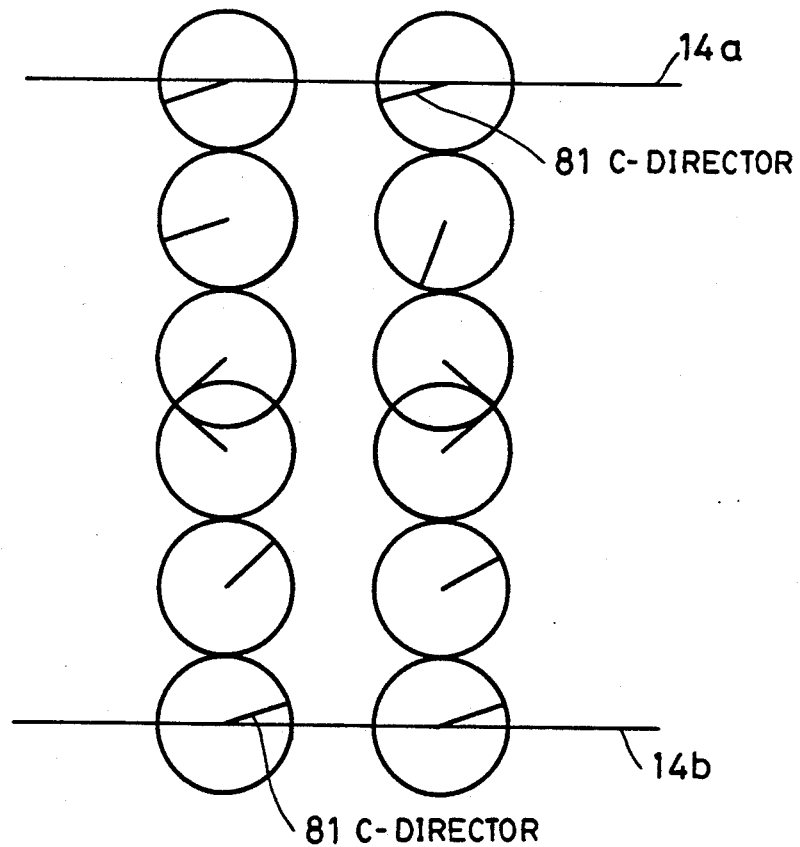
Figure 9:
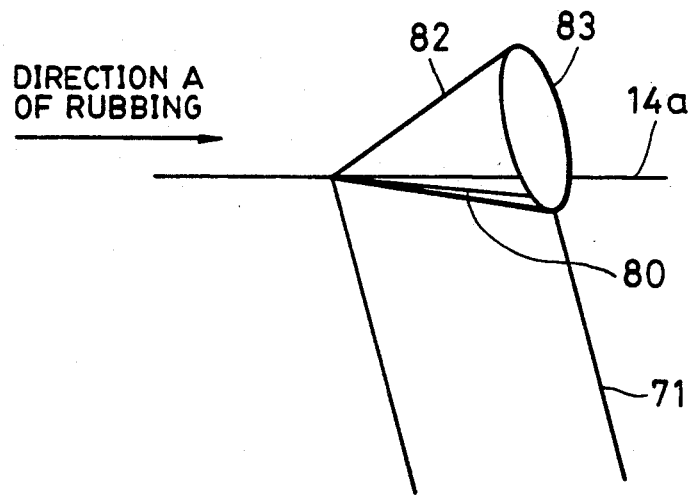
FIG. 9 (A) is a schematic view of the C2 orientation.
Figure 9:
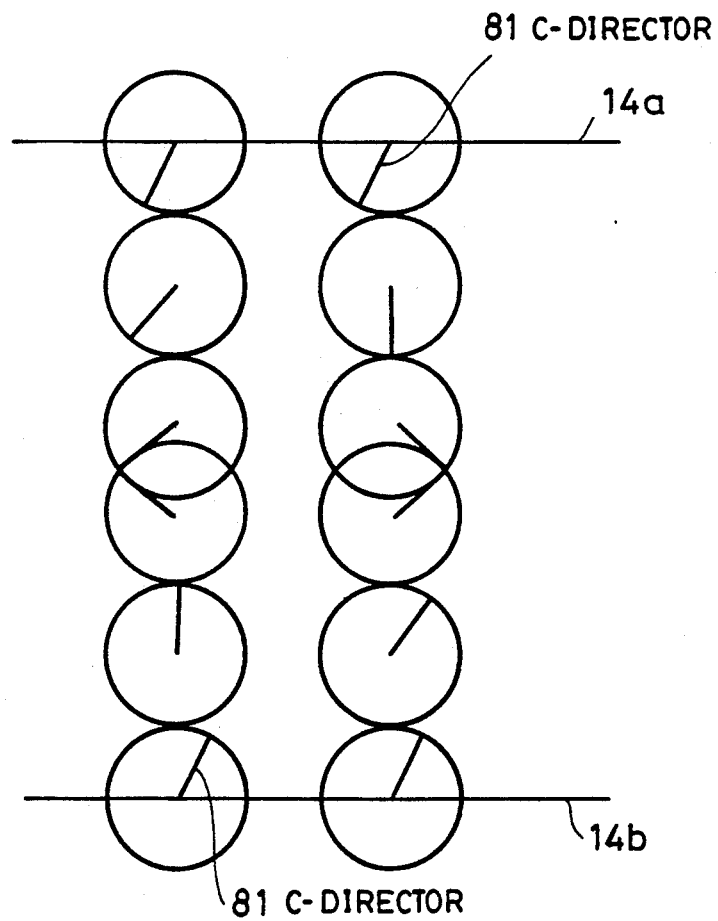

FIG. 8 (A) is an enlarged view of the liquid crystal molecules 72 which are under the C1 orientation state and which form the layer 71, and FIG. 8 (B) shows C-directors 81 (projections of molecular long axes on a virtual surface perpendicular to the normal of the molecular layer 71) of the C1 orientation. FIG. 9 (A) is an enlarged view of the liquid crystal molecules 72 which are under the C2 orientation state and which form the layer 71, and FIG. 9 (B) shows C-directors 81 of the C2 orientation. The liquid crystal molecules 72 are disposed between the interfaces of the upper and lower orientation controlling filsm 14a and 14b such that the projections of molecular long axes 80 onto bottom surfaces (circles) 83 of cones 82 are shifted. The left and right views of FIGS. 8 (B) and 9 (B) respectively illustrate the molecular orientation of the liquid crystals obtained when positive (or negative) pulses and negative (positive) pulses are applied thereto.

FIG. 10 illustrates the molecular orientations which are obtained when the upper and lower orientation controlling films 14a and 14b are rubbed parallel adn in the opposite directions. FIG. 10 (A) shows layers 71 of chiral smectic C phase molecules 72 and those 71 of a plurality of liquid crystal molecules 72 which are oriented in a different state. In the molecular orientations shown in FIG. 10 (A), with respect to the direction A in which the upper orientation controlling film 14a is rubbed, right layers 71R of molecules as viewed in FIG. 10 (A) are tilted in the vicinity of the upper orientation controlling film 14a at an acute angle of $\theta x$, whereas left layers 71L of molecules are tilted in the vicinity of the upper orientation controlling film 14a at an obtuse angle of $\theta y$. With respect to the direction A in which the lower orientation controlling film 14b is rubber, the right layers 71R of molecules are tilted in teh vicinity of the lower orientation controlling film 14b at the obtuse angle of $\theta y$, whereas the left layers 71L of molecules are tilted in the vicinity of the lower orientation controlling film 14b at the acute angle of $\theta x$. In other words, both the right layers 71R and left layers 71L are respectively tilted at the acute and obtuse angles 74 x and $\theta y$ in the vicinity of the upper and lower orientation controlling films 14a and 14b. FIG. 10 (B) shows the C-directors 81 of the layers 71L of molecules. The left and right views of FIG. 10 (B) respectively show the C-directors 81 obtained when the positive (or negative) pulses and negative (or positive) pulses are applied. FIG. 10 (C) shows the C-directors 81 of the layers 71R of molecules. The left and right views of FIG. 10 (C) respectively correspond to the orientations obtained when the pulses are applied as in FIG. 10 (B).

In the C1 orientation domain 73 and the C2 orientation domain 74 shown in FIG. 7, the layers 71 of molecules which form the C1 orientation domain 73 are tilted at the acute angle of $\theta_A$ in the vicinity of both the upper and lower orientation controlling films, whereas the layers 71 of molecules which form the C2 orientation domain 74 are tilted at the obtuse angle of $\theta_B$ in the vicinity of both the upper and lower orientation controlling films.

Furthermore, the orientation (shown in FIg. 8 (B)) of the C-directors 81 corresponding to the C1 orientation domain 73 and that (shown in FIG. 9 (B)) of the C-directors 81 corresponding to the C2 orientation domain 74 are asymmetrical, whereas the orientation of the C-directors corresponding to the layers 71R of molecules and that of the C-directors corresponding to the layers 71L of molecules shown in FIG. 10 (A) are optically equivalent to and symmetrical with each other, as shown in FIGS. 10 (B) and 10 (C).

Figure 11:
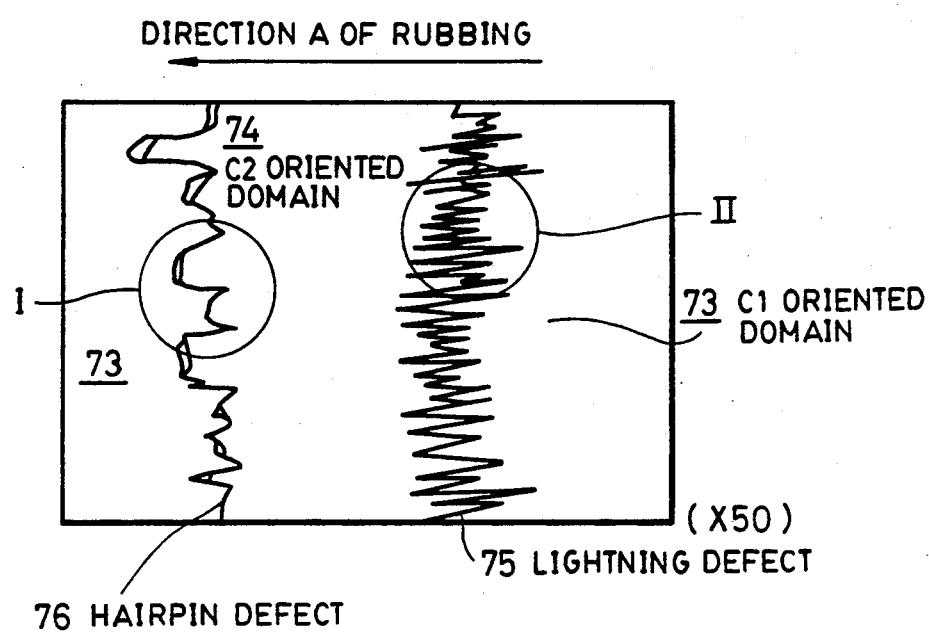
FIGS. 11 to 14 are sketches of microphotographs, showing C1 and C2 orientation domains.

FIG. 11 is a sketch of a microphotograph ($\times 50$) of the C1 orientation domains and the C2 orientation domain. In the orientation state shown in FIG. 11, both the C1 orientation domains 73 and the C2 orientation domain 74 are present, and the lightning defect 75 and the hairpin efect 76 are generated in the adjacent portions thereof. As can be seen in FIG. 11. Where the C2 orientation domain 74 is generated such that it is surrounded by the C1 orientation domains 73, the lightning defect 75 occurs when the C1 orientation domain 73 changes to the C2 orientation domain 74 as viewed in the direction A of the rubbing process. When the C2 orientation domain 74 changes to the C1 orientation domain 73 as viewed in the direction A of the rubbing process, the hairpin defect 73 occurs.

In the present invention, it is possible to generate the C2 orientation domain 74 in nearly the entire area (which is desirably 60% or more, preferably, 80% or more, of the overall area, excluding the peripheral portion of the sealing material) of the cell during cooling by adequately selecting the liquid crystal material and the orientation controlling film. In the preferred form of the present invention, the C1 orientation domain 73 may be generated in the peripheral portion of the cell (e.g., in the vicinity of the sealing material which is used to seal the cell), whereas the C2 orientation domain 74 may be formed inside the peripheral portion of the cell.

Figure 12:
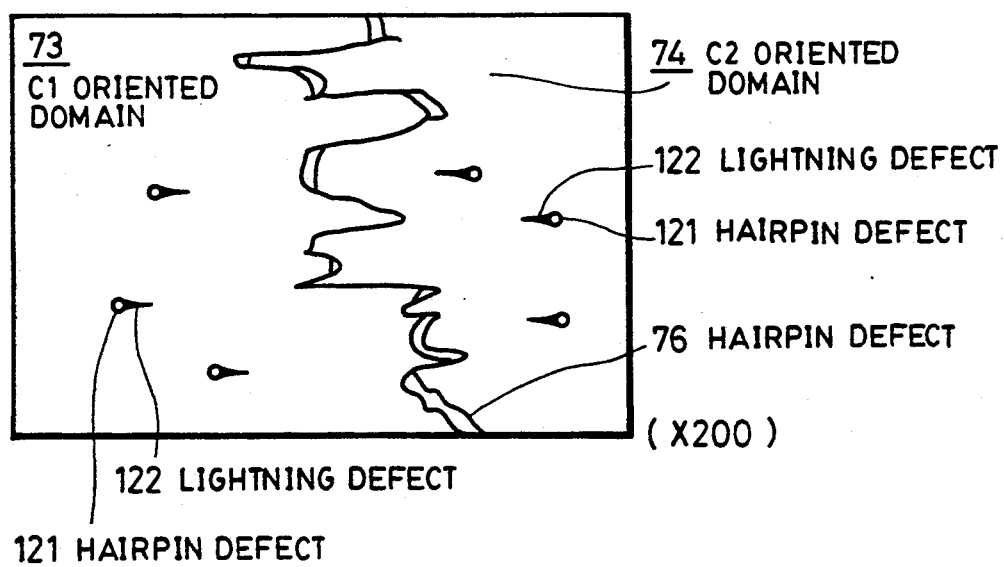

FIG. 12 is a sketch of a microphotograph ($\times 200$) of a cell with beads spaers incorporated therein. FIG. 12 illustrates hairpin defects 121 and lightning defects 122 generated (in the form of pairs) in the C1 orientation domain 73 and the C2 orientation domain 74 which are separated by the hairpin defect 76, by the presence of the beads spacers (which may be alumina or silica beads having an average diameter of 1.5 $\mu$m). As can be seen in FIG. 12, in the C1 orientation domain 73, the hairpin defects 121 are generated in advance of the lightning defects 122 along the direction A of the rubbing process. In contrast, in the C2 orientation domain 74, the lightning defects 122 are generated in advance of the hairpin defects 121 along the direction A of the rubbing process.

Figure 13:
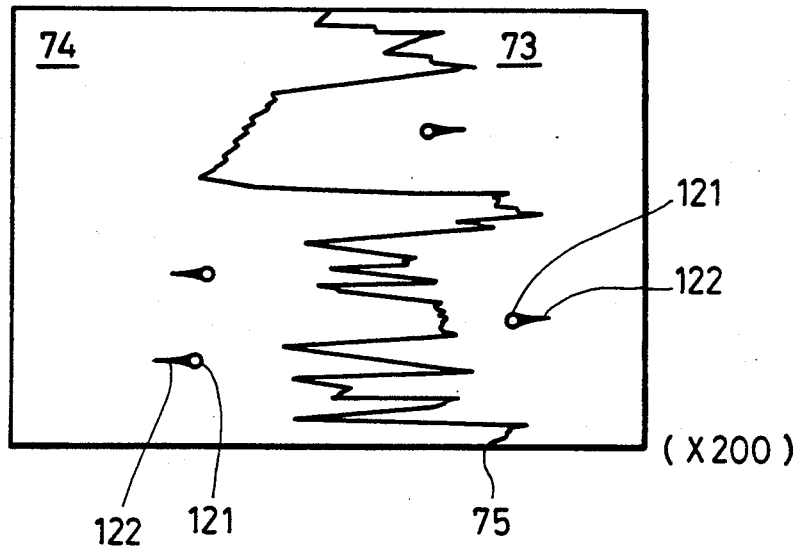

FIG. 13 is a sketch of another microphotograph ($\times 200$) of the C1 orientation domain and the C2 orientation domain. FIG. 13 illustrates the C1 orientation domain 73 and the C2 orientation domain 74 which are separated by the lightning defect 75. As can be seen in FIG. 13, pairs of hairpin defects 121 and lightning defects 122 are generated in the same manner as that of the case shown in FIG. 12.

Figure 14:
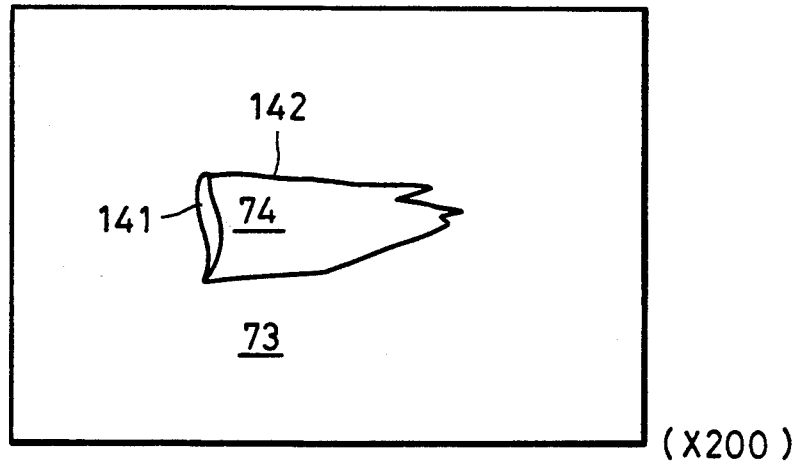

FIG. 14 is a sketch of another microphotograph ($\times 200$) of the C1 orientation domain and the C2 orientation domain. FIG. 14 shows the C2 orientation domain 74 generated when a strain is applied to the C1 orientation domain 73. At that time, a hairpin defect 141 occurs in advance of a lightning defect 143 along the direction A of the rubbing process, as can be seen in FIG. 14.

FIG. 12 is an enlarged view of an area I shown in FIG. 11, and FIG. 13 is an enlarged view of an area II shown in FIG. 11. In the microscopic observation upon which the sketch shown in FIG. 12 was based, the overall area was switched to the dark and extinct states. Furthermore, in the microscopic observations upon which the sketches shown in FIGS. 12 to 14 were based, the overall area blackened since it was switched to the dark state, and then slighted shifted from the extinct state.

Through the various experiments, the present inventors discovered that, when a strain was applied to the C1 orientation domain 73, as shown in FIG. 14, the C2 orientation domain 74 was generated within the C1 orientation domain 73, and that this C2 orientation domain 74 existed stably over a long period of time. The present inventors also found that, when a strain was applied to the C2 orientation domain 74, the C1 orientation domain 73 was generated within the C2 orientation domain 74, and that the resultant C1 orientation domain 73 disappeared immediately after generation. These results led to the conclusions that the C2 orientation domain 73 was more stable than the C1 orientation domain 74 and that the C2 orientation domain 73 restored its original state more quickly than the C1 orientation domain 74 when subjected to the external impacts. The results also led to the conclusion that the C1 orientation domain 73 was brittle against the external impacts. Furthermore, it was found that the amount of light transmitting through the C2 orientation domain 74 in the extinct state was far less than the amount of light transmitting through the C1 orientation domain 73 in the extinct state.

In the present invention, it is posbiel to generate the C2 orientation domain, in which the hairpin defect occurs in advance of the lightning defect along the direction of the uniaxial orientation process (such as the rubbing process or the oblique deposition process) over nearly the entire area in the cell. Although there is no limitation to the ferroelectric smectic liquid crystal which is utilized in the present invention, the present inventors have determined that the ferroelectric smectic liquid crystal should be selected from those which have correlation with the orientation controlling films as a combination of the orientation controlling films and the liquid crystal. Thus, in the preferred form of the present invention, a chiral smectic C liquid crystal having a temperature range which achieves the cholesteric phase and the smectic A phase in the cooled process may be suitably employed.

Figure 15:
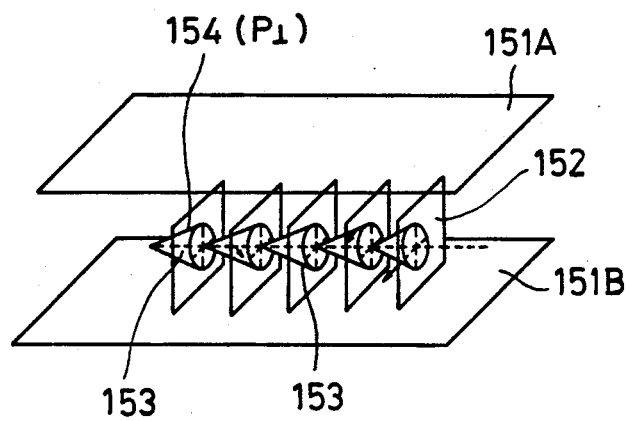
FIG. 15 is a perspective view of a ferroelectric liquid crystal device illustrating its operation schematically.

In the preferred form of the present invention, the temperature range which generates the C1 orientation in which the hairpin defects occur in advance of the lightning defects along the direction of the rubbing process or the oblique deposition process may be 1/5th or less, preferably, 1/10th or less, and more preferably, 1/20th or less, of the temperature range which causes the C2 orientation in which the lightning defects occur in advance of the hairpin defects Furthermore, the lower limit of the temperature at which the C1 orientation state is generated in the cooled process may be 30° C. or above, and preferably, 40° C. or above FIG. 15 is a schematic view of an example of a liquid crystal cell, explaining the operation of the ferroelectric liquid crystal In FIG. 15, reference numerals 151A and 51B denote substrates (glass plates) with thin transparent electrodes made of $In_2O_2$, $SnO_2$ or ITO coated thereon The substrates 151A and 151B are separated by a SmC* (chiral smectic C) or SmH* (chiral smectic H) liquid crystal which is oriented in such a way that layers 152 of molecules are disposed perpendicular to the surfaces of the glass plates. A reference numeral 153 denotes liquid crystal molecules having dipole moments (P⊥) 154 in the direction perpendicular to the molecular axes thereof. When a voltage higher than a certain threshold level is applied between the electrodes provided on the substrates 151A and 151B, the helix of the liquid crystal molecules 153 is unwound, and the liquid crystal molecules 153 are therefore realigned such that the dipole moments (P⊥) thereof are all directed in the electric field. The liquid crystal molecules 153 have an elongated form, and exhibit refractive anisotropy between the long and short axes thereof. In consequence, it is easily understood that the provision of, for example, polarizers above and below the surfaces of the glass plates in the cross nicols allows the liquid crystal cell to act as a liquid crystal optical modulation element in which the optical characteristics of the liquid crystal cell changes with the reversal of the polarity of the electric field.

Figure 16:
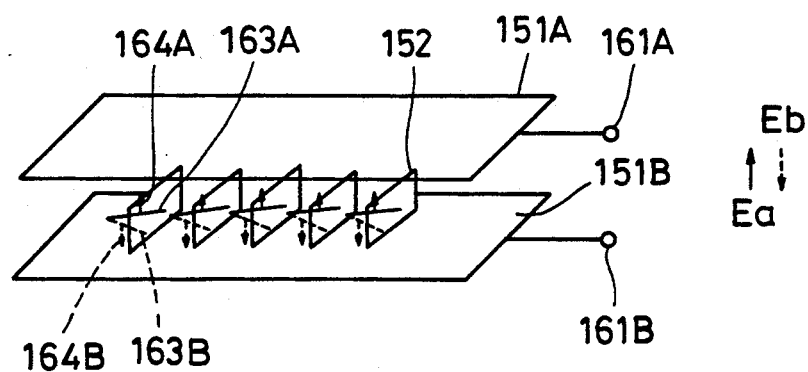
FIG. 16 is a perspective view of a surface stability type ferroelectric liquid crystal device possessing the two stable states according to the present invention, also illustrating its operation schematically.

The surface stability type ferroelectric liquid crystal cell according to the present invention whose orientation field possesses two stable states can be formed as a thin element (having a thickness, for example, between 0.1 μm and 3 μm). In that thin state, the helix of the liquid crystal molecules is unwound in the absence of an electric field, as shown in FIG. 16, and the dipole moments P or P' of the liquid crystal molecules are therefore directed either upward (as indicated by the arrows 164A) or downward (as indicated by the arrows 164B). When an electric field Ea or Eb, which have a voltage higher than a certain threshold level and which are different in polarity, is applied to the above-described cell by means of voltage applying means 161A and 161B, as shown in FIG. 16, the dipole moments are directed either upward (164A) or downward (164B) in accordance with the vector of the electric field Ea or Eb, causing the liquid crystal molecules to be accordingly oriented in either the first stable state 163A or the second stable state 163B.

The ferroelectric liquid crystal cell arranged in the above-described manner is characterized by its high-speed response and its bistability. When an electric field Ea is applied to the liquid crystal cell, the liquid crystal molecules are oriented in the first stable state 163A, which is stable in the absence of the electric field. When an electric field Eb having the polarity opposite to that of the electric field Ea is applied to the cell, the liquid crystal molecules are oriented in the second stable state 163b, which is also stable in the absence of the electric field. Furthermore, as long as the electric field Ea applied remains within the certain threshold level, the liquid crystal molecules remain in that state.

Examples of the present invention will now be described below.

EXAMPLE 1

The ferroelectric liquid crystal device having a structure shown in FIG. 1 (B) was manufactured in the manner described below: First, transparent electrodes 12a and 12b which formed the base layers for the orientation controlling films 14a and 14b were respectively formed on the upper and lower substrates 11a and 11b by means of the sputtering. The transparent electrodes 12a and 12b were ITO electrodes having a thickness of 800 Å. The average surface roughnesses S of the ITO electrodes 12a and 12b were measured by a scanning type tunnel microscope (STM, Nanoscope II, sold by Toyo Technica K.K.), and the standard deviation thereof was then calculated. The result was 36.3 A.

The orientation controlling films 14a and 14b which were made of polyimide resin were respectively formed to a thickness d of 100 Å on the ITO electrodes 12a and 12b. These polyimide films were formed first by coating Sunever 150 the alicyclic polyimide film-forming liquid (a 3% solution of a mixture which contained N-methyl-pyrrolidone and n-butylcellosolve at a weight ratio of 3:1) manufactured by Nissan Chemicals Industries, Ltd., for 30 seconds by means of a spinner which was rotating at 2000 rpm, and then heating the alicyclic polyimide film-forming liquid at 250° C. for about 1 hour. Subsequently, the polyimide films were rubbed in one direction by a acetate hairy cloth. Thereafter, the glass plates were washed by isopropyl alcohol, and was then dried at 120° C. for 20 minutes. Subsequently, after the alumina beads having an average diameter of 1.5 μm were scattered over one of the glass plates, the other glass plate was placed on the beads in such a manner that the directions in which the two glass plates were rubbed were parallel to and the same with each other so as to form a cell, such that the upper and lower ITO electrodes intersected. At that time, S/d was 0.363.

CS-1014 the ferroelectric smectic liquid crystal manufactured by Chisso Corporation, was vacuum injected under the isotropic phase into the cell, and the liquid crystal was then gradually cooled to 30° C. at a rate of 0.5° C./h to obtain molecular orientation.

The phase transition temperatures of the resultant cell of this Example which employed "CS-1014" were as follows:

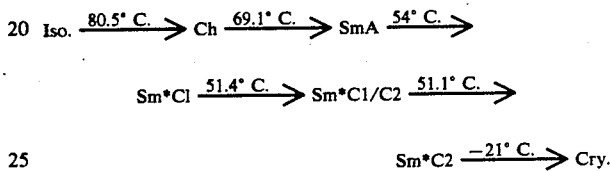

$$\text{Iso.} \xrightarrow{80.5°\text{C.}} \text{Ch} \xrightarrow{69.1°\text{C.}} \text{SmA} \xrightarrow{54°\text{C.}}$$

$$\text{Sm}^*\text{C1} \xrightarrow{51.4°\text{C.}} \text{Sm}^*\text{C1/C2} \xrightarrow{51.1°\text{C.}}$$

$$\text{Sm}^*\text{C2} \xrightarrow{-21°\text{C.}} \text{Cry.}$$

In this cell, the C2 orientation domain was stable in the temperature range from about 50° C. to −20° C. The cell had no defects in its molecular orientation and exhibited excellent bistability.

The following experiments were conducted on the thus-obtained cell at 25° C. The liquid crystal cell was interposed between a pair of polarizers which were disposed in the 90° cross nicols state, and the liquid crystal cell was then multiplex driven by the waveforms shown in FIG. 19 to display on a display panel 181 the contents shown in FIG. 18 (A) in which a black portion 183 was surrounded by a white portion 182. Thereafter, the display panel 181 was switched over such that it only displayed the white portion. The white portion was displayed uniformly over the entire screen, and no portion 185 shown in FIG. 18 (B) where the previously displayed contents were burned remained on the screen.

Figure 19:
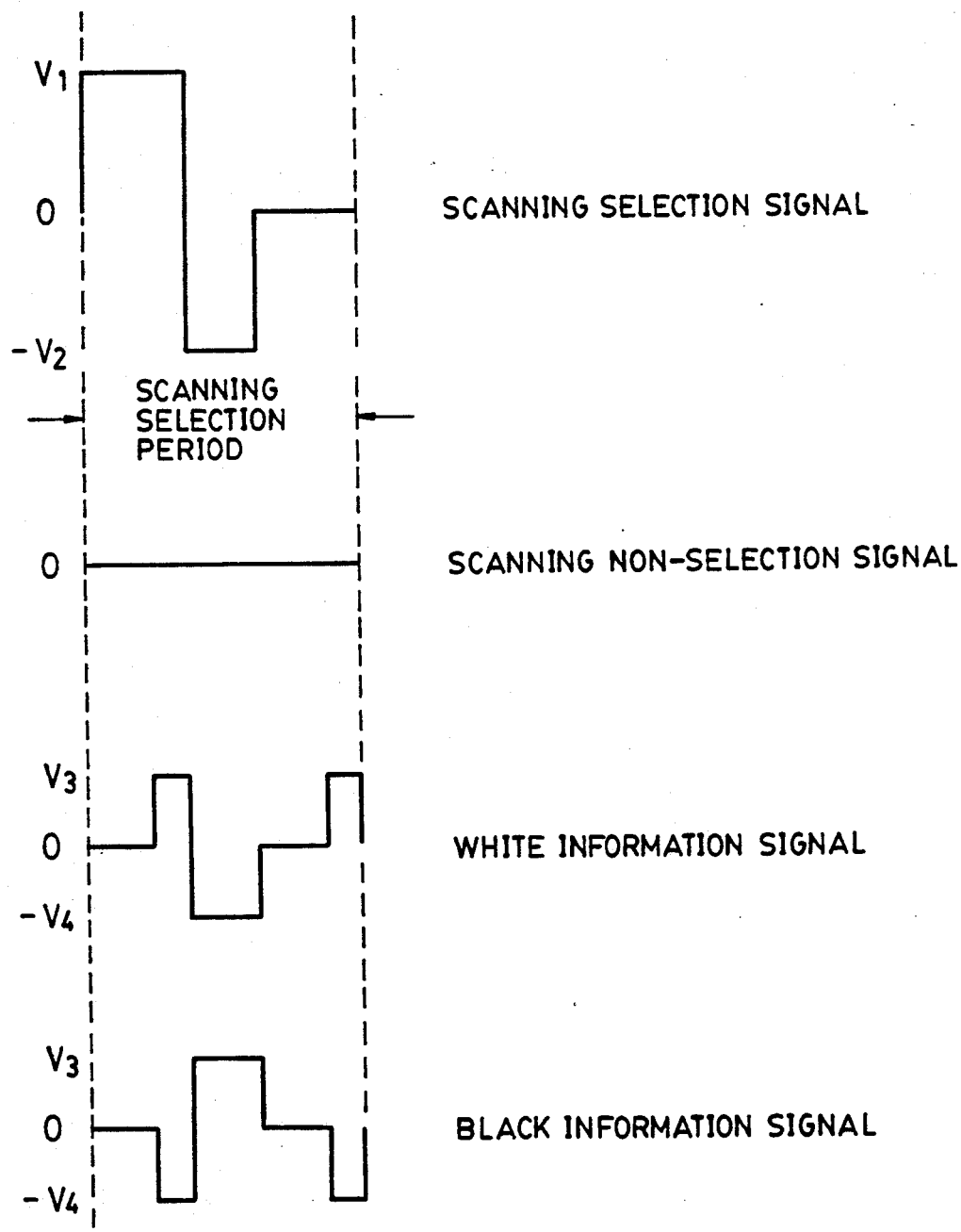
FIG. 19 shows examples of driving waveforms employed in the present invention.

The driving conditions and the display panel which were employed at that time were as follows:
The driving waveforms: As shown in FIG. 19
Number of scanning lines: 1120 lines
Number of data lines: 1280 lines
Scanning selection period: 150 μsec
Voltage V1, V2: 20 v
Voltage V3, V4: 10 v
For the display of the black portion 183,
Number of scanning lines: 320 lines
Number of data lines: 550 lines

EXAMPLES 2 TO 6

Liquid crystal cells were manufactured using the materials for the orientation controlling films and the liquid crystal which are listed in Table 1 in the same manner as that by which Example 1 was manufactured. The same experiments as in Example 1 were conducted on the individual cells. After the display panels were switched over such that they displayed only the white portion, no portion on which the previously displayed contents were burned occurred on the display panels.

TABLE 1

| Example | Orientation Controlling Film | Liquid Crystal Material |
|---|---|---|
| 2 | "Sunever 150" (trademark) of Nissan Chemicals Industries, Ltd. | "CS-1011" (trademark), FLC of Chisso Corporation |
| 3 | "SE4110" (trademark), alicyclic polyimide of Nissan Chemicals Industries, Ltd. | "CS-1014" (trademark), FLC of Chisso Corporation |
| 4 | "SE4110" | "CS-1011" |
| 5 | "JIG-1" (trademark), alicyclic polyimide of Nippon Synthetic Rubber Co., Ltd. | "CS-1014" |
| 6 | "LP-64" (trademark), aromatic polyimide of Toray Industries, Inc. | "CS-1014" |

(In the Table, "FLC" denotes a ferroelectric smectic liquid crystal.)

Table 2 lists the phase transition temperatures of the cells of these Examples.

TABLE 2

(Unit: °C.)

| Example | Iso → Ch | Ch → SmA | SmA → Sm*C1 | Sm*C1 → Sm*C1/C2 | Sm*C1/C2 → Sm*C2 | Sm*C2 → Cry. |
|---|---|---|---|---|---|---|
| 2 | 91 | 78 | 55 | 52 | 50 | 0 or less |
| 3 | 80.5 | 69.1 | 54 | 52 | 51 | −20 |
| 4 | 91 | 78 | 55 | 53 | 51 | 0 or less |
| 5 | 80.5 | 69.1 | 54 | 52 | 51 | −20 |
| 6 | 80.5 | 69.1 | 54 | 53 | 51 | −20 |

As can be seen from Table 2 the phase transition point from Sm*C1 phase to Sm*C1/C2 phase and that from Sm*C1/C2 phase to Sm*C2 are inherent in the individual cells and therefore differ in each cell.

EXAMPLE 7

The liquid crystal cell was manufactured in the same manner as that in which the cell of Example 1 was manufactured using the same materials with the exception that the ITO electrodes 12a and 12b had a thickness of 2650 Å and that the orientation controlling films were formed in a thickness of 600 Å. Thereafter, the same liquid crystal as that employed in Example 1 was injected into the thus-obtained cell to manufacture a liquid crystal device of Example 7.

The average surface roughness S of the ITO electrodes 12a and 12b was 72.1 Å, and S/d was 0.120. Furthermore, the liquid crystal device exhibited excellent molecular orientation with no defects at a room temperature, as in the case of the cell of Example 1.

Next, the cell was driven for display in the same manner as that in which the cell of Example 1 was driven. After the display panel was switched over such that it displayed only the white portion, no burning of the previously displayed contents occurred.

EXAMPLES 8 AND 9

The liquid crystal cells of Examples 8 and 9 were manufactured in the same manner as that of Example 1 with the exception that the orientation controlling films 14a and 14b were respectively formed in thicknesses of 200 Å (Example 8) and 600 Å (Example 9). When these cells were driven for display in the same manner as that of Example 1, the same results were obtained. S/d of the cells of Examples 8 and 9 were 0.181 and 0.06, respectively.

EXAMPLES 10 AND 11

The liquid crystal cells of Examples 10 and 11 were manufactured in the same manner as that of Example 7 with the exception that the orientation controlling films 14a and 14b were formed in thicknesses of 200 Å (Example 10) and 500 Å (Example 11). After these cells were driven for display in the same manner as that of Example 1, the same results were obtained. S/d of the cells of Examples 8 and were 0.363 and 0.144, respectively.

EXAMPLE 12

The liquid crystal cell was manufactured in the same manner as that of Example 1 with the exception that the ITO electrodes 12a and 12b were formed in a thickness of 2550 Thereafter, the same liquid crystal as that employed in Example 1 was injected into the thus-obtained cell to form a liquid crystal device. The average surface roughness S of the ITO electrodes 12a and 12b was 68.2 Å, and S/d was 0.682 (d=100 Å).

Next, the cell was driven for display in the same manner as that of Example 1. After the display panel was switched over such that it displayed only the white portion, no burning of the previously displayed contents occurred.

EXAMPLE 13

The liquid crystal cell was manufactured in the same manner as that of Example 1 with the exception that the ITO electrodes 12a and 12b were formed in a thickness of 2250 Å. Thereafter, the same liquid crystal as that employed in Example 1 was injected into the thus-obtained cell to form a liquid crystal device. The average surface roughness S of the ITO electrodes 12a and 12b was 62.3 Å, and S/d was 0.623 (d=100 Å).

Next, the cell was driven for display in the same manner as that of Example 1. After the display panel was switched over such that it displayed only the white portion, no burning of the previously displayed contents occurred.

EXAMPLE 14

The liquid crystal cell was manufactured in the same manner as that of Example 1 with the exception that the ITO electrodes 12a and 12b were formed in a thickness of 2100 Å. Thereafter, the same liquid crystal as that employed in Example 1 was injected into the thus-obtained cell to form a liquid crystal device. The average surface roughness S of the ITO electrodes 12a and 12b was 54.5 Å, and S/d was 0.545 (d=100 Å).

Next, the cell was driven for display in the same manner as that of Example 1. After the display panel was switched over such that it displayed only the white portion, no burning of the previously displayed contents occurred.

EXAMPLE 15

The liquid crystal cell was manufactured in the same manner as that of Example 1 with the exception that the ITO electrodes 12a and 12b were formed in a thickness of 1450 Å. Thereafter, the same liquid crystal as that employed in Example 1 was injected into the thus-obtained cell to form a liquid crystal device. The average surface roughness S of the ITO electrodes 12a and 12b was 50.6 A, and S/d was 0.506 (d=100 A).

Next, the cell was driven for display in the same manner as that of Example 1. After the display panel was switched over such that it displayed only the white portion, no burning of the previously displayed contents occurred.

COMPARISON EXAMPLE 1

The liquid crystal cell was manufactured in the same manner as that of Example 1 with the exception that th ITO electrodes 12a and 12b were formed in a thickness of 2650 Å. Thereafter the same liquid crystal as that employed in Example 1 was injected into the thus-obtained cell to form a liquid crystal device. The average surface roughness S of the ITO electrodes 12a and 12b was 72.1 Å, and S/d was 0.721 (d=100 A).

When the molecular orientation of this liquid crystal device was observed at a room temperature, it was not good and had many efects.

Figure 18:
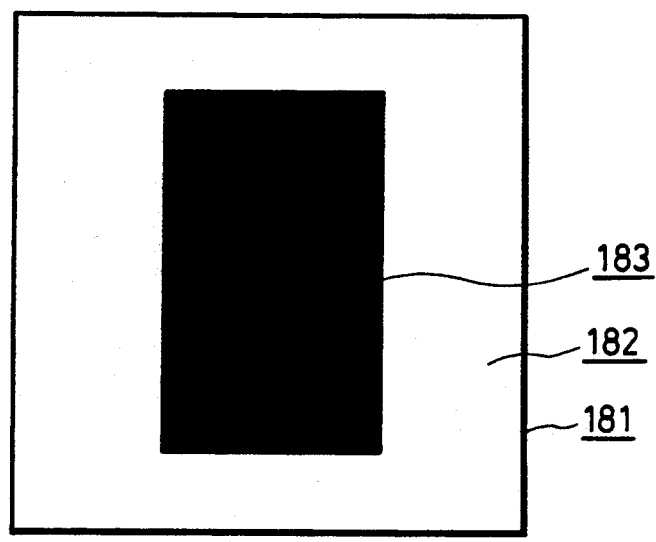
FIGS. 18 (A) and 18 (B) are plan views of a display panel.
Figure 18:
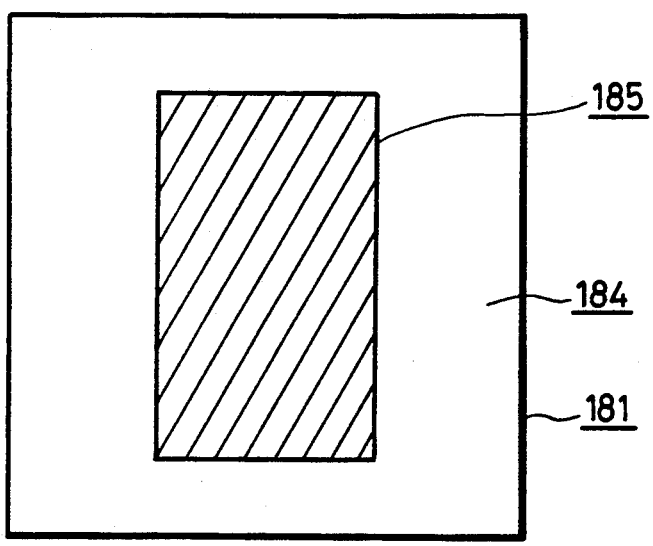

Next, the cell was driven for display in the same manner as that of Example 1. When the contents shown in FIG. 18 (A) was displayed and then the display was switched over such that the display panel displayed only the white portion, the previously displayed contents remained in light gray within a white portion 184 obtained after the switch-over of the display to form a portion 185 where the previously displayed contents were burned, as shown in FIG. 18 (B). The burning remained for a few hours.

COMPARISON EXAMPLES 2 AND 3

The liquid crystal cells were manufactured in the same manner as that of Example 7 with the exception that the orientation controlling films 14a and 14b were formed in thicknesses of 90 Å (Comparison Example 2) and 80 Å (Comparison Example 3). When these cells were driven for display in the same manner as that of Example 1, the same results as those of Comparison Example 1 were obtained. S/d for the cells of Comparison Examples 2 and 3 was 0.801 and 0.912, respectively.

COMPARISON EXAMPLES 4 AND 5

The liquid crystal cells were manufactured in teh same manner as that of Example 12 with the exception that the orientation controlling films 14a and 14b were formed in thicknesses of 90 Å (Comparison Example 4) and 80 Å (Comparison Example 5). When these cells were driven for display in the same manner as that of Example 1, the same results as those of Comparison Example 1 were obtained. S/d for the cells of Comparison Examples 4 and 5 was 0.758 and 0.853, respectively.

COMPARISON EXAMPLE 6

The liquid crystal cell was manufactured in the same manner as that of Example 13 with the exception that the orientation controlling films 14a and 14b were formed in a thickness of 80Å. When the cell was driven for display in the same manner as that of Example 1, the same results as those of Comparison Example 1 were obtained. S/d for the cell was 0.779.

COMPARISON EXAMPLE 7 TO 11

The liquid crystal cells were manufactured using the materials for the orientation controlling films and the liquid crystal listed in Table 3 in the same manner as that in which that of Example 1 was manufactured.

TABLE 3

| Comparison Example | Orientation Controlling Film | Liquid Crystal Material |
|---|---|---|
| 7 | "SP-710" (trademark), aromatic polyimide of Toray Industries, Ltd. | "CS-1017" (trademark), FLC of Chisso Corporation |
| 8 | "SP-710" | "CS-1018" (trademark), FLC of Chisso Corporation |
| 9 | "X-419B" (trademark), polyimide of Nitto Electric Industrial Co., Ltd. | "CS-1017" |
| 10 | "X-419B" | "CS-1018" |
| 11 | "X-419B" | "CS-1014" |

Table 4 lists the phase transition temperatures of the cells of these Comparison Examples.

TABLE 4
(Unit: °C.)

| Comparison Example | Iso → Ch → | SmA → | Sm*C1 → | Sm*C1/C2 → | Sm*C2 → Cry. (0° C. or less) |
|---|---|---|---|---|---|
| 7 | 66.4    62.5 | 52.8 | — | — (Sm*C2 did not appear) | — |
| 8 | 74.5    71.7 | 58 | — | — (Sm*C2 did not appear) | — |
| 9 | 66.4    62.5 | 52.8 | — | — (Sm*C2 did not appear) | — |
| 10 | 74.5    71.7 | 58 | — | — (Sm*C2 did not appear) | — |
| 11 | 80.5    69.1 | 54 | — | — (Sm*C2 did not appear) | — |

As can be seen from Table 4, no cells of Comparison Examples achieved Sm*C2 phase in any temperature range.

Next, the cells of Comparison Examples 7 to 11 were driven for display in the same manner as that of Example 1. After the display was switched over such that the display panel displayed only the white portion, the portion where the previously displayed contents were burned was recognized.

As will be understood from the foregoing description, in the present invention, the problem involving the burning of the previously displayed contents could be eliminated. In this invention, it was found that the burning could be eliminated by the improvement in the bistability, and that the improvement in the bistability could be in turn achieved by the smooth change of the C1 orientation to the C2 orientation in the cooling process, which was achieved when $0 \leq S/d < 0.70$. The smooth change in the orientation enables a high quality of display.

What is claimed is:

1. A liquid crystal apparatus comprising:
   (a) a liquid crystal device including a ferroelectric liquid crystal disposed between a pair of substrates having an orientation controlling film supported by at least one of said substrates, said orientation controlling film having a uniaxial orientation processing axis, each of said substrates having plural electrodes arranged so that the electrodes of one said substrate intersect those of the other of said substrates, wherein said ferroelectric smectic liquid crystal generates different bistable orientation states at high and low temperature regions within a temperature range which achieves a ferroelectric smectic phase, said ferroelectric smectic liquid crystal being capable of attaining the bistable orientation state generated at the low temperature region by cooling the liquid crystal from the bistable orientation state generated at the high temperature region, and said liquid crystal device satisfies $0 \leq S/d < 0.70$, where d is the thickness of said orientation controlling film and S is the average surface roughness of said at least one substrate supporting said orientation controlling film; and
   (b) driving means for producing and applying a scanning selection signal to the electrode of one of said substrates, the scanning selection signal being applied in a scanning selection period, wherein in a first part of the period, said scanning selection signal has a voltage of one polarity, in a second part of the period said scanning selection signal has a voltage of the opposite polarity, and in a third part of the period said scanning selection signal has a voltage of the same voltage as a scanning non-selection signal;
   said driving means also for producing and applying one of first and second information signals selected in accordance with designated information to the electrodes of the other of said substrates, the selected one of the first and second information signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second information signals has two voltages consisting of a voltage of the same voltage as the scanning non-selection signal and a voltage of the first polarity.

2. A liquid crystal apparatus according to claim 1, wherein the bistable orientation state generated at the low temperature region appears in said liquid crystal at 30° C. or above when said liquid crystal cools.

3. A liquid crystal apparatus according to claim 2, wherein the bistable orientation state generated at the low temperature region appears in said liquid crystal at 40° C. or above when said liquid crystal cools down.

4. A liquid crystal apparatus according to claim 1, wherein said ferroelectric smectic phase is chiral smectic C phase.

5. A liquid crystal apparatus according to claim 1, wherein said orientation controlling film is a polyimide, polyamide or polyester film.

6. A liquid crystal apparatus according to claim 5, wherein said orientation controlling film is a polyimide film.

7. A liquid crystal apparatus according to claim 1, wherein said orientation controlling film is obliquely deposited silicon oxide.

8. A liquid crystal apparatus according to claim 1, further comprising an under layer of a film containing a oxide, titanium oxide or a tantalum oxide, said under layer film being located between said substrate and said orientation controlling film.

9. A liquid crystal apparatus according to claim 1, wherein each of said substrates supports one of said orientation controlling films such that the uniaxial orientation processing axes of said orientation controlling films is parallel or substantially parallel to and in the same direction as each other.

10. A liquid crystal apparatus according to claim 1, wherein said orientation controlling film has a thickness d of 600 Å or less.

11. A liquid crystal apparatus according to claim 1, wherein said under layer has an average surface roughness S of 100 Å or less.

12. A liquid crystal apparatus comprising:
   (a) a liquid crystal device including a ferroelectric liquid crystal disposed between a pair of substrates having an orientation controlling film supported by at least one of said substrates, said orientation controlling film having a uniaxial orientation processing axis, each of said substrates having plural electrodes arranged so that the electrodes of one said substrate intersect those of the other of said substrates, wherein said ferroelectric smectic liquid crystal generates different bistable orientation states in which pairs of hairpin defects and lightning defects occur, said ferroelectric smectic liquid crystal has an orientation state developing a generation order inw hich a lightning defect is generated in advance of a hairpin defect along the direction of said uniaxial orientation processing axis, and said liquid crystal device satisfying the relation expressed by $0 \leq S/d < 0.70$, where d is the thickness of said orientation controlling film and S is the average surface roughness of the surface underneath said orientation controlling film; and
   (b) driving means for producing and applying a scanning selection signal to the electrode of one of said substrates, the scanning selection signal being applied in a scanning selection period, wherein in a first part of the period, said scanning selection signal has a voltage of one polarity, in a second part of the period said scanning selection signal has a voltage of the opposite polarity, and in a third part of the period said scanning selection signal has a voltage of the same voltage as a scanning nonselection signal;

said driving means also for producing and applying one of first and second information signals selected in accordance with designated information to the electrodes of the other of said substrates, the selected one of the first and second information signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second information signals has two voltages consisting of a voltage of the same voltage as the scanning non-selection signal and a voltage of the first polarity.

13. A liquid crystal apparatus according to claim 12, wherein said orientation controlling film is a polyimide, polyamide or polyester film.

14. A liquid crystal apparatus according to claim 13, wherein said orientation controlling film is an polyimide film.

15. A liquid crystal apparatus according to claim 12, wherein said orientation controlling film is obliquely deposited a silicon oxide.

16. A liquid crystal apparatus according to claim 12, further comprising an under layer of a film containing a silicon oxide, a titanium oxide or tantalum oxide, said under layer film being located between said substrate and said orientation controlling film.

17. A liquid crystal apparatus according to claim 12, wherein each of said substrates supports one of said orientation controlling films such that the uniaxial orientation processing axes of said orientation controlling films is parallel or substantially parallel to and in the same direction as each other.

18. A liquid crystal apparatus according to claim 12, having a display cell with an overall area wherein the domain of the orientation state developing said generation order defines an area which is at least 60% of the overall area of the cell.

19. A liquid crystal apparatus according to claim 18, wherein a domain of the orientation state developing said generation order includes an area which was acquired by growth of said domain of the orientation state developing said generation order from a domain of another orientation state developing another generation order.

20. A liquid crystal apparatus according to claim 19, wherein a temperature region in which said domain of the orientation state developing another generation order grows to such an extent that it occupies more than 40% of the overall area of the cell when said liquid crystal cools is 1/5th of a temperature region in which said doamin of the orientation developing another generation order grows to such an extent that it occupies less than 40% of the area of the cell.

21. A liquid crystal apparatus according to claim 19, wherein a temperature region in which said domain of the orientation state developing another generation order grows to such an extent that it occupies more than 40% of the overall area of the cell when said liquid crystal cools is 1/10th of a temperature region in which said domain of the orientation developing another generation order grows to such an extent that it occupies less than 40% of the ara of the cell.

22. A liquid crystal apparatus according to claim 19, wherein a temperature region in which said domain of the orientation state developing another generation order grows to such an extent that it occupies more than 40% of the overall area of the cell when said liquid crystal cools is 1/20th of a temperature region in which said domain of the orientation developing another generation order grows to such an extent that it occupies less than 40% of the area of the cell.

23. A liquid crystal apparatus according ot claim 19, wherein the lower limit of the temperature region at which the orientation state developing another generation order grows to such an extent that it occupies more than 40% of the overall area of the cell when said liquid crystal cools is 30° C. or above.

24. A liquid crystal apparatus according to claim 19, wherein the lower limit of the temperature region at which the orientation state developing another generation order grows to such an extent that it occupies more than 40% of the overall area of the cell when said liquid crystal cools is 40° C. or above.

25. A liquid crystal apparatus according to claim 18, wherein the domain of the orientation state developing another generation order is generated in an area disposed adjacent to a sealing material, and the domain of the orientation state developing said generation order is generated in an area disposed further from said sealing material.

26. A liquid crystal apparatus according to claim 18, wherein, in the domain of the orientation state developing another generation order, a lightning defect occurs in front of a hairpin defect along the direction of said uniaxial orientation processing axis.

27. A liquid crystal apparatus according to claim 12, wherein two states of said domain of the orientation state developing said generation order are optically equivalent.

28. A liquid crystal apparatus according to claim 12, wherein said ferroelectric smectic liquid crystal is chiral smectic C phase liquid crystal.

29. A liquid crystal apparatus according to claim 12, wherein said orientation controlling film has a thickness d of 600 Å or less.

30. A liquid crystal apparatus according to claim 12, wherein said base film has an average surface roughness S of 100 Å or less.

31. A liquid crystal apparatus comprising:
(a) a liquid crystal device including a ferroelectric liquid crystal disposed between a pair of substrates having an orientation controlling film supported by at least one of said substrates, said orientation controlling film having a uniaxial orientation processing axis, each of said substrates having plural electrodes arranged so that the electrodes of one said substrate intersect those of the other of said substrates, wherein said ferroelectric smectic liquid crystal generates different bistable orientation states at high and low temperature regions within a temperature range which achieves a chiral smectic phase, said liquid crystal device satisifies $0 < d \leq 600 Å,$ $0 \leq S \leq 100$ Å, and $0 \leq S/d < 0.70$, where d is the thickenss of said orientation controlling film and S is the average surface roughness of said at least one substrate supporting said orientation controlling film; and (b) driving means for producing and applying a scanning selection signal to the electrode of one of said substrates, the scanning selection signal being applied in a scanning selection period, wherein in a first part of the period, said scanning selection signal has a voltage of one polarity, in a second part of the period said scanning selection signal has a voltage of the opposite polarity, and in a third part of the period said scanning selection signal has a voltage of the same voltage as a scanning non-selection signal;

said driving means also for producing and applying one of first and second information signals selected in accordance with designated information to the electrodes of the other of said substrates, the selected one of the first and second information signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second information signals has two voltages consisting of a voltage of the same voltage as the scanning non-selection signal and a voltage of the first polarity.

32. A liquid crystal apparatus according to claim 31, wherein said orientation controlling film is a polyimide, polyamide or polyester film.

33. A liquid crystal apparatus according to claim 32, wherein said orientation controlling film is a polyimide film.

34. A liquid crystal apparatus according to claim 31, wherein said orientation controlling film is an obliquely deposited silicon oxide.

35. A liquid crystal apparatus according to claim 31, wherein said under layer is a film containing silicon oxide, titanium oxide or tantalum oxide.

36. A method for driving a liquid crystal device which includes a ferroelectric liquid crystal disposed between a pair of substrates having an orientation controlling film supported by at least oen of said substrates, said orientation controlling film having a uniaxial orientation processing aixs, each of said substrates having plural electrodes arranged so that the electrodes of one said substrate intersect those of the other of said substrates, wherein said ferroelectric smectic liquid crystal generates different bistable orientation states at high and low temperature regions within temperature range which achieves a ferroelectric smectic phase, said ferroelectric smectic liquid crystal being capable of attaining the bistable orientation state generated at the low temperature region by cooling the liquid crystal from the bistable orientation state generated at the high temperature region, and said liquid crystal device satisfies $0 \leq S/d < 0.70$, where d is the thickness of said orientation controlling film and S is the average surface roughness of said at least one substrate supporting said orientation controlling film, said method comprising:

applying a scanning selection signal to the electrode of one of said substrates, the scanning selection signal being applied in a scanning selection period, wherein in a first part of the period, said scanning selection signal has a voltage of one polarity, in a second part of the period said scanning selection signal has a voltage of the opposite polarity, and in a third part of the period said scanning selection signal has a voltage of the same voltage as a scanning non-selection signal;

and applying one of first and second information signals selected in accordance with designated information to the electrodes of the other of said substrates, the selected one of the first and second information signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second information signals has two voltages consisting of a voltage of the same voltage as the scanning non-selection signal and a voltage of the first polarity.

37. A method for driving a liquid crystal device which incudes a ferroelectric liquid crystal disposed between a pair of substrates having an orientation controlling film supported by at least one of said substrates, said orientation controlling film having a uniaxial orientation processing aixs, each of said substrates having plural electrodes arranged so that the electrodes of one said substrate intersect those of the other of said substrates, wherein said ferroelectric smectic liquid crystal generates different bistable orientation states in which pairs of hairpin defects and lightning defects occur, said ferroelectric smectic liquid crystal has an orientation state developing a generation order in which a lightning defect is generated in advance of a hairpin defect along the direction of said uniaxial orientation processing axis, and said liquid crystal device satisfying the relation expressed by $0 \leq S/d < 0.70$, where d is the thickness of said orientation controlling film and S is the average surface roughness of the surface underneath said orientation controlling film, said method comprising:

applying a scanning selection signal to the electrode of one of said substrates, the scanning selection signal being applied in a scanning selection period, wherein in a first part of the period, said scanning selection signal has a voltage of one polarity, in a second part of the period said scanning selection signal has a voltage of the opposite polarity, and in a third part of the period said scanning selection signal has a voltage of the same voltage as a scanning non-selection signal;

and applying one of first and second information signals selected in accordance with designated information to the electrodes of the other of said substrates, the selected one of the first and second information signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second informatino signals has two voltages consisting of a voltage of the same voltage as the scanning non-selection signal and a voltage of the first polarity.

38. A method for driving a liquid crystal apparatus, according to claim 37, wherein in said apparatus, said orientation controlling film is a polyimide, polyamide, or polyester film.

39. A method for driving a liquid crystal apparatus, according to claim 38, wherein in said apparatus, said orientation controlling film is a polyimide film.

40. A method for driving a liquid crystal apparatus, according to claim 37, wherein in said apparatus, said orientation controlling film is an obliquely deposited silicon oxide.

41. A method for driving a liquid crystal apparatus, according to claim 37, wherein said liquid crystal apparatus further comprises an under layer of a film containing a silicon oxide, a titanium oxide, or tantalum oxide, said under layer film being located between said substrate and said orientation controlling film.

42. A method according to claim 37, wherein in said liquid crystal apparatus each of said substrates supports one of said orientation controlling films such that the uniaxial orientation processing axes of said orientation controlling films are parallel, or substantially parallel, to and in the same direction as each other.

43. A method according to claim 37, wherein said liquid crystal apparatus, having a display cell with an overall area wherein the domain of the orientation state developing said generation order defines an area which is at least 60% of the overall area of the cell.

44. A method according ot claim 43 wherein a domain of the orientation state developing said generation order includes an area which was acquired by growth of said domain of the orientation from a domain of another orientation state developing another generation order.

45. A method for driving a liquid crystal apparatus, according to claim 44, wherein a temeprature region in which said domain of the orientation state developing another generation order grows to such an extent that it occupies more than 40% of the overall area of the cell when said liquid crystal cools is 1/5th of a temperature region in which said domain of the orientation developing another generation order grows to such an extent that it occupies less than 40% of the area of the cell.

46. A method for driving a liquid crystal apparatus, according to claim 44, wherein a temeprature region in which said domain of the orientation state developing another generation order grows to such an extent that it occupies more than 40% of the overall area of the cell when said liquid crystal cools is 1/10th of a temperature region in which said domain of the orientation developing another generation order grows to such an extent that it occupies less than 40% of the area of the cell.

47. A method for driving a liquid crystal apparatus, according to claim 44, wherein a temeprature region in which said domain of the orientation state developing another generation order grows to such an extent that it occupies more than 40% of the overall area of the cell when said liquid crystal cools is 1/20th of a temperature region in which said domain of the orientation developing another generation order grows to such an extent that it occupies less than 40% of the area of the cell.

48. A method for driving a liquid crystal apparatus, according to claim 44, wherein a temeprature region in which said domain of the orientation state developing another generation order grows to such an extent that it occupies more than 40% of the overall area of the cell when said liquid crystal cools is 30° C. or above.

49. A method for driving a liquid crystal apparatus, according to claim 48, wherein a temeprature region in which said domain of the orientation state developing another generation order grows to such an extent that it occupies more than 40% of the overall area of the cell when said liquid crystal cools is 40° C. or above.

50. A method for driving a liquid crystal apparatus, according to claim 43, wherein the domain of the orientation state developing another generation order is generated in an area disposed adjacent to a sealing amterial, and the domain of the orientation state developing said generation order is generated in an area disposed further from the vicinity said sealing material.

51. A method for driving a liquid crystal apparatus according to claim 43, wherein in the domain of the orientation state developing another generation order, a lightning defect occurs in front of a hairpin defect along the direction of said uniaxial orientation processing axis.

52. A method for driving a liquid crystal apparatus according to claim 37, wherein in said liquid crystal apparatus, two states of said doamin of the orientation state developing said generation order are optically equivalent.

53. A method for driving a liquid crystal apparatus, according to claim 37, wherein in said apparatus, the ferroelectric smectic liquid crystal is chiral smectic C phase liquid crystal.

54. A method for driving a liquid crystal apparatus, according to claim 37, wherein in said apparatus, the orientation controlling film has a thickness d of 600 Å or less.

55. A method for driving a liquid crystal apparatus, according to claim 37, wherein in said apparatus, the substrate has an average surface roughness of 100 Å or less.

56. A method for driving a liquid crystal device which includes a ferroelectric liquid crystal disposed between a pair of substrates having an orientation controlling film supported by at least one of said substrates, said orientation controlling film having a uniaxial orientation processing axis, each of said substrates having plural electrodes arranged so that the electrodes of one said substrate intersect those of the other of said substrates, wherein said ferroelectric smectic liquid crystal generates different bistable orientation states at high and low temperature regions within a temperature range which achieves a chiral smectic phase, and said liquid crystal device satisfies $0 < d \leq 600 \text{Å}$, $0 \leq S \leq 100 \text{Å}$, and $0 \leq S/d < 0.70$, where d is the thickenss of said orientation controlling film and S is the average surface roughness of said at least one substrate supporting said orientation controlling film, said method comprising:

applying a scanning selection signal to the electrode of one of said substrates, the scanning selection signal being applied in a scanning selection period, wherein in a first part of the period, said scanning selection signa lhas a voltage of one polarity, in a second part of the period said scanning selection signal has a voltage of the opposite polarity, and in a third part of the period said scanning selection signal has a voltage of the same voltage as a scanning non-selection signal;

and applying one of first and second information signals selected in accordance with designated information to the electrodes of the other of said substrates, the selected one of the first and second ifnormation signals being applied in synchronism with the scanning selection period, wherein in the first part of said scanning selection period the selected one of the first and second information signal has two voltages consisting of a voltage of the same voltage as the scanning non-selection signal and a voltage of a first polarity, in the second part of said scanning selection period the selected one of the first and second information signals has one voltage consisting of a voltage of a polarity opposite the first polarity, and in the third part of said scanning selection period the selected one of the first and second information signals has two voltages consisting of a voltage of the same voltage as the scanning non-selection signal and a voltage of the first polarity.

* * * * *

UNITED STATES PATENT AND TRADEMARK OFFICE
CERTIFICATE OF CORRECTION

PATENT NO. : 5,076,671
DATED : December 31, 1991
INVENTOR(S) : TOSHIHARU UCHIMI, ET AL.

Page 1 of 3

It is certified that error appears in the above-identified patent and that said Letters Patent is hereby corrected as shown below:

COLUMN 4

Line 67, "to" should read --to 3000 Å,--.

COLUMN 5

Line 63, "ferroelectric smectic" should read
--ferroelectric smectic liquid crystal manufactured
by Chrisso Corporation was used--.

COLUMN 8

Line 31, "74 x" should read --θx--.

COLUMN 17

Line 56, "signal" should read --signals--.

COLUMN 18

Line 22, "a" should read --a silicon--.
Line 52, "inw hich" should read --in which--.

COLUMN 19

Line 28, "an" should read --a--.
Line 31, "is" should read --is an--.
Line 32, "a" should be deleted.
Line 62, "doamin" should read --domain--.

UNITED STATES PATENT AND TRADEMARK OFFICE
CERTIFICATE OF CORRECTION

PATENT NO. : 5,076,671

DATED : December 31, 1991

INVENTOR(S) : Toshiharu Uchimi, et al

It is certified that error appears in the above-identified patent and that said Letters Patent is hereby corrected as shown below:

COLUMN 20

Line 5, "ara" should read --area--.
Line 15, "ot" should read --to--.

COLUMN 21

Line 57, "oen" should read --one--.
Line 59, "aixs," should read --axis,--.

COLUMN 23

Line 17, "informatino" should read --information--.
Line 65, "temeprature" should read --temperature--.

COLUMN 24

Line 6, "temeprature" should read --temperature--.
Lines 15-16 and 21-22, deleting "a temeperature region in which said domain of " and inserting --the lower limit of the temperature at which--.
Line 29, "amterial," should read --material,--.
Line 32, "vicinity" should read --vicinity of--.
Line 40, "doamin" should read --domain--.

COLUMN 25

Line 9, "thickenss" should read --thickness--.
Line 19, "signa lhas" should read --signal has--.

UNITED STATES PATENT AND TRADEMARK OFFICE
CERTIFICATE OF CORRECTION

PATENT NO. : 5,076,671
DATED : December 31, 1991
INVENTOR(S) : TOSHIHARU UCHIMI, ET AL.

Page 3 of 3

It is certified that error appears in the above-identified patent and that said Letters Patent is hereby corrected as shown below:

COLUMN 26

Line 7, "ifnormation" should read --information--.

Signed and Sealed this

Twenty-second Day of June, 1993

Attest:

MICHAEL K. KIRK

*Attesting Officer*   Acting Commissioner of Patents and Trademarks